United States Patent
Light-Holets et al.

(10) Patent No.: US 11,920,533 B2
(45) Date of Patent: Mar. 5, 2024

(54) SYSTEMS AND METHODS FOR COORDINATION OF SKIP-FIRE AND AFTERTREATMENT HEATER OPERATION TO MAINTAIN EXHAUST GAS TEMPERATURE

(71) Applicants: Cummins Inc., Columbus, IN (US); Tula Technology, Inc., San Jose, CA (US)

(72) Inventors: Jennifer Kay Light-Holets, Greenwood, IN (US); J. Steven Kolhouse, Columbus, IN (US); Christopher R. Nelson, Columbus, IN (US); Anant Puri, Greenwood, IN (US); Xiaobo Song, Columbus, IN (US); Avra Brahma, Fishers, IN (US)

(73) Assignees: Cummins Inc., Columbus, IN (US); Tula Technology, Inc., San Jose, CA (US)

( * ) Notice: Subject to any disclaimer, the term of this patent is extended or adjusted under 35 U.S.C. 154(b) by 0 days.

(21) Appl. No.: 17/927,573

(22) PCT Filed: May 27, 2020

(86) PCT No.: PCT/US2020/034650
§ 371 (c)(1),
(2) Date: Nov. 23, 2022

(87) PCT Pub. No.: WO2021/242228
PCT Pub. Date: Dec. 2, 2021

(65) Prior Publication Data
US 2023/0204000 A1 Jun. 29, 2023

(51) Int. Cl.
*F01N 3/20* (2006.01)
*F02D 41/00* (2006.01)
(Continued)

(52) U.S. Cl.
CPC ........... *F02D 41/024* (2013.01); *F01N 3/202* (2013.01); *F01N 3/2026* (2013.01);
(Continued)

(58) Field of Classification Search
CPC ........ F01N 3/103; F01N 3/2013; F01N 3/202; F01N 3/2026; F01N 3/2033;
(Continued)

(56) References Cited

U.S. PATENT DOCUMENTS

| | | |
|---|---|---|
| 3,975,951 A | 8/1976 | Kohama et al. |
| 4,449,362 A | 5/1984 | Frankenberg et al. |

(Continued)

FOREIGN PATENT DOCUMENTS

| | | |
|---|---|---|
| DE | 10 2005 013 707 A1 | 9/2006 |
| DE | 10 2008 030 307 | 12/2009 |

(Continued)

OTHER PUBLICATIONS

European Search Report on EP 21152288.3 dated Jun. 25, 2021, 9 pages.
(Continued)

*Primary Examiner* — Mark A Laurenzi
*Assistant Examiner* — Dapinder Singh
(74) *Attorney, Agent, or Firm* — FOLEY & LARDNER LLP

(57) ABSTRACT

A system includes an aftertreatment system heater of an exhaust aftertreatment system coupled to an engine A controller coupled to the aftertreatment system heater is configured to determine a condition of an exhaust gas from an engine and compare the condition to a predefined threshold. If the condition of the exhaust gas does not meet the predefined threshold, the controller is configured to determine whether an engine operating condition is met for activating a cylinder deactivation operating mode for the
(Continued)

engine. If the engine operating condition is met, the controller is configured to operate the engine in the cylinder deactivation operating mode by deactivating a cylinder of a plurality of cylinders. If the engine operating condition is not met, the controller is configured to activate the aftertreatment system heater to heat the exhaust gas.

20 Claims, 5 Drawing Sheets

(51) Int. Cl.
  F02D 41/02 (2006.01)
  F02D 41/38 (2006.01)
  F02M 27/04 (2006.01)
(52) U.S. Cl.
  CPC ......... *F01N 3/2033* (2013.01); *F01N 3/2066* (2013.01); *F02D 41/0002* (2013.01); *F02D 41/005* (2013.01); *F02D 41/0087* (2013.01); *F02D 41/38* (2013.01); *F02M 27/04* (2013.01); *F02D 2041/389* (2013.01); *F02D 2200/0804* (2013.01); *F02D 2200/50* (2013.01)
(58) Field of Classification Search
  CPC ...... F01N 3/2066; F01N 9/00; F01N 2240/16; F01N 2900/08; F01N 2900/1404; F02D 41/0002; F02D 41/005; F02D 41/0087; F02D 41/024; F02D 41/1446; F02D 41/1461; F02D 41/1466; F02D 41/38; F02D 2200/0804; F02D 2200/10; F02D 2200/50; F02M 27/04; Y02T 10/12; Y02T 10/40
  See application file for complete search history.

(56) References Cited

U.S. PATENT DOCUMENTS

| | | |
|---|---|---|
| 5,746,053 A | 5/1998 | Hibino |
| 6,032,461 A | 3/2000 | Kinugasa et al. |
| 6,325,053 B1 | 12/2001 | Zappador et al. |
| 6,477,831 B1 | 11/2002 | Ballinger et al. |
| 6,681,563 B2 | 1/2004 | Glugla et al. |
| 7,104,051 B2 | 9/2006 | Shimasaki et al. |
| 8,042,326 B2 | 10/2011 | Farell et al. |
| 8,051,644 B2 | 11/2011 | Gonze et al. |
| 8,117,832 B2 | 2/2012 | Wagner et al. |
| 8,347,607 B2 | 1/2013 | Gonze et al. |
| 8,475,574 B2 | 7/2013 | Gonze et al. |
| 8,505,282 B2 | 8/2013 | Gonze et al. |
| 8,883,102 B1 | 11/2014 | Lambert et al. |
| 9,038,376 B2 | 5/2015 | Petrovic et al. |
| 9,328,674 B2 | 5/2016 | Geveci et al. |
| 9,388,722 B2 | 7/2016 | Gonze et al. |
| 9,470,128 B2 | 10/2016 | Silvers et al. |
| 9,863,352 B2 | 1/2018 | Stenlaas et al. |
| 9,878,767 B2 | 1/2018 | Dahlberg et al. |
| 9,968,886 B2 | 5/2018 | Balenovic et al. |
| 10,273,846 B2 | 4/2019 | Baensch et al. |
| 10,371,029 B2 | 8/2019 | Sakuma et al. |
| 10,408,103 B1 | 9/2019 | Miao et al. |
| 10,494,971 B2 | 12/2019 | Younkins et al. |
| 2009/0000604 A1 | 1/2009 | Bond et al. |
| 2011/0067386 A1 | 3/2011 | Gonze et al. |
| 2012/0060471 A1 | 3/2012 | Gonze et al. |
| 2012/0102920 A1 | 5/2012 | Pipis, Jr. |
| 2012/0167554 A1* | 7/2012 | Zhang .................. F01N 3/2006 60/287 |
| 2012/0173062 A1 | 7/2012 | Madurai Kumar et al. |
| 2013/0047607 A1 | 2/2013 | Petrovic |
| 2013/0213010 A1 | 8/2013 | Zhang et al. |
| 2015/0315952 A1 | 11/2015 | Hall |
| 2016/0153417 A1 | 6/2016 | Tochigi |
| 2017/0037799 A1 | 2/2017 | Balenovic et al. |
| 2017/0130630 A1 | 5/2017 | Younkins |
| 2018/0094556 A1 | 4/2018 | Kurtz et al. |
| 2018/0142599 A1 | 5/2018 | Pannuzzo et al. |
| 2018/0202985 A1 | 7/2018 | Wait |
| 2018/0334939 A1 | 11/2018 | Mital et al. |
| 2018/0334970 A1 | 11/2018 | Kamo |
| 2019/0155230 A1* | 5/2019 | Culbertson ............. F01N 3/208 |
| 2019/0360415 A1 | 11/2019 | Romanato |
| 2020/0011257 A1* | 1/2020 | Stretch ................... F02D 17/02 |
| 2020/0040785 A1 | 2/2020 | Choi |
| 2020/0102874 A1 | 4/2020 | Kurtz et al. |
| 2020/0232359 A1 | 7/2020 | Kaack et al. |
| 2020/0408163 A1 | 12/2020 | Webb et al. |

FOREIGN PATENT DOCUMENTS

| | | |
|---|---|---|
| DE | 10 2012 007 053 | 10/2013 |
| DE | 10 2015 200 023 | 7/2015 |
| DE | 10 2019 110 783 A1 | 11/2019 |
| DE | 10 2018 217 169 A1 | 4/2020 |
| DE | 10 2019 215 698 B3 | 12/2020 |
| GB | 2 478 541 | 9/2011 |
| WO | WO-2006/012484 | 2/2006 |
| WO | WO-2006/100051 | 9/2006 |
| WO | WO-2008/109215 | 9/2008 |
| WO | WO-2012/040613 | 3/2012 |
| WO | WO-2014/055018 | 4/2014 |
| WO | WO-2016/029207 | 2/2016 |
| WO | WO-2020/074268 | 4/2020 |
| WO | WO-2021/069162 | 4/2021 |

OTHER PUBLICATIONS

International Search Report and Written Opinion on PCT/US2020/034650, dated Aug. 4, 2020, 11 pages.
Non-Final Office Action on U.S. Appl. No. 16/884,897 dated Jun. 7, 2021.
Notice of Allowance on U.S. Appl. No. 16/884,897 dated Sep. 21, 2021.
Notice of Allowance on U.S. Appl. No. 17/330,062 dated Apr. 12, 2022.
US Notice of Allowance on U.S. Appl. No. 16/884,897 dated Jan. 20, 2022.
Extended European Search Report on EP App. No. 23175621.4 dated Aug. 21, 2023.
Non-Final Office Action on U.S. Appl. No. 17/751,336 dated Jun. 14, 2023.
Office Action, dated Oct. 9, 2023, issued in related German Patent Application No. 102021113464.1.

* cited by examiner

SYSTEMS AND METHODS FOR COORDINATION OF SKIP-FIRE AND AFTERTREATMENT HEATER OPERATION TO MAINTAIN EXHAUST GAS TEMPERATURE

TECHNICAL FIELD

The present disclosure relates generally to reducing harmful emissions from an engine.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply.

In this regard, exhaust gas may contain harmful constituents (e.g., nitrous oxides (NOx), sulfur oxides, particulate matter, etc.). Accordingly, the use of exhaust aftertreatment systems with engines to reduce harmful emissions is increasing. Exhaust aftertreatment systems may contain one or more catalysts that react with the exhaust gas to convert the harmful constituents to less harmful elements that are then released to the environment. Increasing catalytic activity is therefore important in reducing the amount of harmful emissions. Increasing catalytic activity may be achieved by, for example, increasing a temperature of the catalyst. Increasing catalyst temperature may promote intended operation of the catalyst (e.g., reducing NOx to less harmful compounds).

SUMMARY

One embodiment relates to a system. The system includes an aftertreatment system heater of an exhaust aftertreatment system coupled to an engine. A controller coupled to the aftertreatment system heater is configured to determine a condition of an exhaust gas from an engine and compare the condition to a predefined threshold. If the condition of the exhaust gas does not meet the predefined threshold, the controller is configured to determine whether an engine operating condition is met for activating a cylinder deactivation operating mode for the engine. If the engine operating condition is met, the controller is configured to operate the engine in the cylinder deactivation operating mode by deactivating a cylinder of a plurality of cylinders. If the engine operating condition is not met, the controller is configured to activate the aftertreatment system heater to heat the exhaust gas.

Another embodiment relates to a method of reducing emissions. The method includes determining a condition of an exhaust gas of an engine and comparing the condition of the exhaust gas to a predefined threshold. In response to determining that the condition of the exhaust gas does not meet the predefined threshold, the method includes determining whether an engine operating condition is met for activating a cylinder deactivation operating mode. In response to determining that the engine operating condition is met, the method includes operating the engine in the cylinder deactivation operating mode by deactivating a cylinder of a plurality of cylinders. The method further includes comparing an amount of power available in a power system to a predefined threshold amount of power. In response to determining that the amount of power is greater than the predefined threshold amount of power, the method includes activating the aftertreatment system heater to heat the exhaust gas.

Yet another embodiment relates to a method of reducing emissions from an engine. The method includes determining a condition of an exhaust gas of the engine and comparing the condition of the exhaust gas to a predetermined threshold. In response to determining that the condition of the exhaust gas does not meet the predefined threshold, the method includes determining whether an engine operating condition is met for activating a cylinder deactivation operating mode for the engine, comparing an amount of power available in a power system to a predefined threshold amount of power, and implementing additional actions, where the determining, comparing, and implementing occur substantially simultaneously. In response to determining that the engine operating condition is not met, the method includes operating the engine in the cylinder deactivation operating mode by deactivating a first cylinder of a plurality of cylinders. In response to determining that the amount of power available in the power system is greater than the predefined threshold, the method includes activating an aftertreatment system heater to heat the exhaust gas.

DETAILED DESCRIPTION

Figure 1:
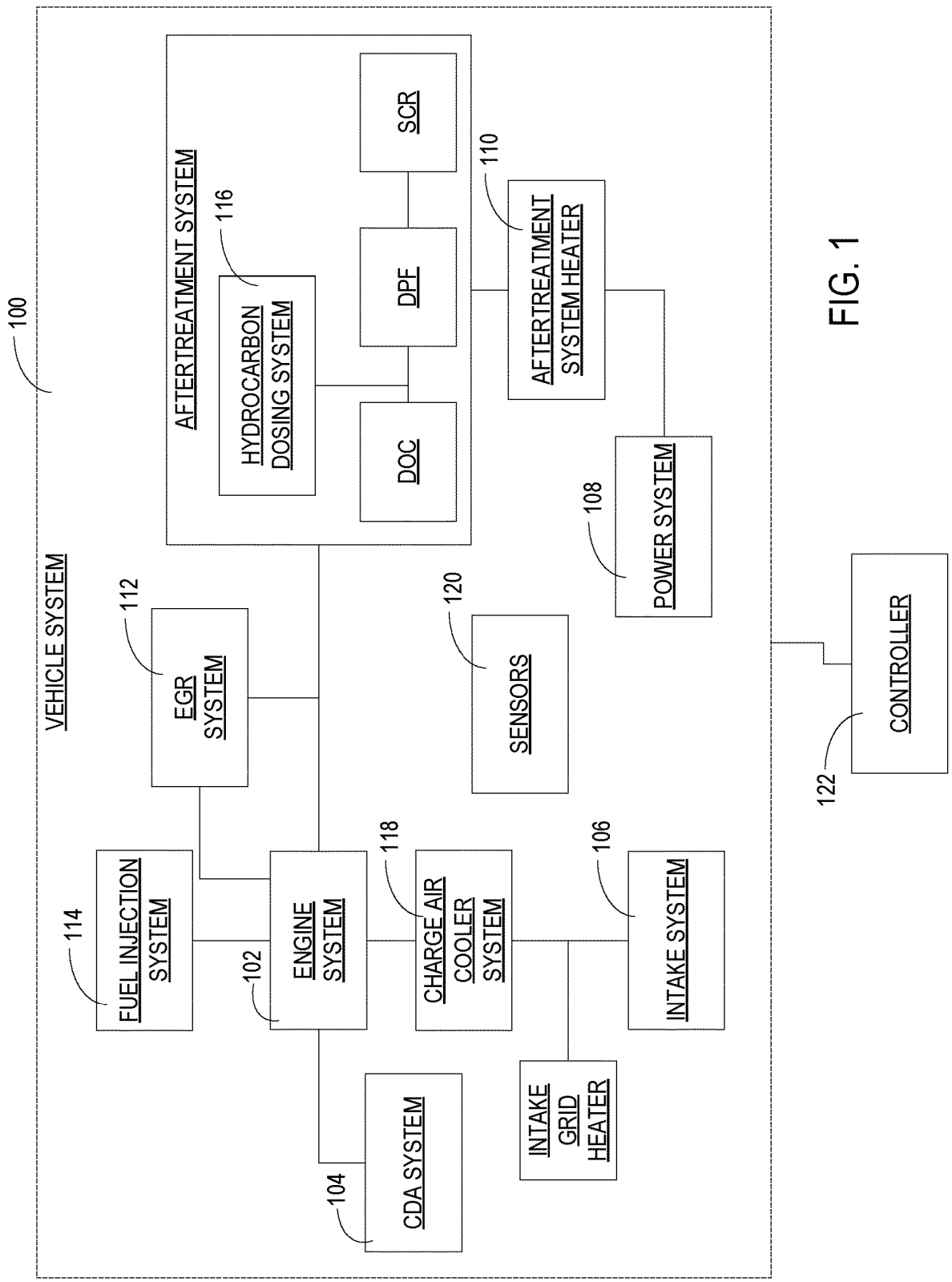
FIG. 1 is an illustration of a controller coupled to an engine system, according to an exemplary embodiment.

Following below are more detailed descriptions of methods, apparatuses, and systems for reducing harmful emissions from an engine. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

During engine operation, various harmful emissions are released into the environment via the exhaust gas. Many vehicles include an aftertreatment system configured to reduce the amount of these emissions. An aftertreatment system can include one or more of a selective catalytic reduction ("SCR") system, a diesel oxidation catalyst ("DOC"), and a diesel particulate filter ("DPF"). An SCR system converts nitrogen oxides (NOx) into nitrogen and water, thereby reducing the amount of NOx released to the environment. A DOC converts hydrocarbons and carbon monoxide into carbon dioxide and water, thereby reducing the amount of hydrocarbons and carbon monoxide released to the environment. SCR systems and DOCs are most effective when the exhaust gas is at or above a preset threshold (e.g., approximately 200° Celsius ("C")). Higher exhaust gas temperatures heat the catalysts of the SCR system and the DOC to promote catalyst activity, which results in intended operation of these catalysts to reduce harmful emissions from the engine. A DPF is configured to capture particulate matter, thereby reducing the amount of particulate matter (e.g., soot, etc.) released to the environment. Because the DPF captures particulate matter, the DPF must be cleaned on a routine basis to avoid clogging. Typically, cleaning the DPF requires increasing the temperature of the exhaust gas to at least 450° C. to burn the accumulated particulate matter.

There are various instances during operation of an engine when the temperature of the exhaust gas is too low for the various aftertreatment systems to be effective. Those instances include, but are not limited to, operating the engine at low speed immediately after starting the engine, operating the engine in a cold environment, etc. Among other applications, the systems and methods described herein are configured to increase the temperature of the exhaust gas during such instances to reduce harmful emissions that would otherwise be released to the environment.

According to the present disclosure, methods, apparatuses, and systems are disclosed that increase the temperature of exhaust gas from an engine to promote exhaust aftertreatment system catalytic activity. These systems include, but are not limited to, aftertreatment system heaters, cylinder deactivation systems, hydrocarbon dosing systems, fuel injection systems, and intake systems.

Aftertreatment system heaters can be added to a conventional aftertreatment system. An aftertreatment system heater is configured to increase the temperature of the exhaust gas to either 1) raise the temperature of the exhaust gas to at least 200° C. to promote catalyst activity in the aftertreatment system, or 2) further elevate the temperature of the exhaust gas to increase the effectiveness of the aftertreatment system.

Cylinder deactivation ("CDA") technology enables a CDA mode of operation for an engine of the vehicle. CDA refers to the ability to activate and deactivate one or more cylinders of an engine during operation of the engine and vehicle. CDA is typically utilized to conserve fuel by only utilizing a sub-set of the cylinders to power the vehicle. A CDA mode of operation can also be used for other purposes as well, such as, for example, balancing cylinder usage and warming up the engine. Operating an engine in a CDA mode can increase the temperature of the exhaust gas by reducing the overall flow of exhaust gas and/or requiring the active cylinders to produce the same amount of total work as the engine produced prior to entering a CDA mode.

During CDA mode, one or more cylinders are deactivated/inactive (i.e., combustion does not occur), such that power from the engine is provided from less than all of the cylinders. In some situations, one or more of the air intake valves may be closed so to not allow air for combustion to flow into the cylinder thereby preventing combustion. In other situations, air may be allowed to flow through the cylinder but combustion is prevented via no spark or diesel fuel injection. Cylinder deactivation mode is a broad term that encompasses various related but distinct cylinder deactivation operating modes. A first type of CDA operating mode is known as "fixed cylinder CDA." In fixed cylinder CDA mode, the same cylinder(s) are active/inactive each engine cycle during the fixed cylinder CDA operating mode. A second type of CDA operating mode is known as "skip-fire", "dynamic skip-fire", or "DSF" operating mode. In skip-fire CDA mode, the cylinder(s) that are active/inactive may change on a cycle-by-cycle basis (e.g., a cylinder may be inactive a first engine cycle and active a second engine cycle). An "active" cylinder means that combustion is allowed to occur in that cylinder. The present disclosure is applicable with each type of CDA operating mode, and the term "CDA mode", "CDA operating mode", or "cylinder deactivation mode" is used to indicate herein that each type of operating mode is possible/applicable with the associated concept(s). The term "non-CDA mode" is used to indicate herein when an engine is not operating in either fixed cylinder CDA mode or skip-fire CDA mode (e.g., all of the cylinders of the engine are active).

A hydrocarbon (HC) dosing system is configured to introduce fuel into the exhaust gas. HC dosing may be performed before the exhaust gas flows through the DPF. The introduction of fuel at this stage allows various catalysts present in the system to react with the hydrocarbons present in the fuel to increase the temperature of the exhaust gas.

A fuel injection system is configured to deliver fuel to a cylinder of the engine for combustion in the cylinder. Fuel can be injected into a cylinder at any point during an engine cycle, and the timing of the fuel injection can impact the temperature of the exhaust gas. For instance, the fuel injection system may utilize close post injection based on a temperature set-point to raise exhaust gas temperature entering the catalyst. In certain fueling systems, there can be multiple strikes (i.e., injections). For instance, a small pilot injection may be commanded followed by a big main injection for combustion. These injections may occur in the power stroke, or sometimes even in the exhaust stroke. Any injection that happens after the main injection is a "post injection." Post injections are not used to produce power, but to produce exhaust energy. Post injections include a close post injection and a far post injection. Close post injections happen very close to the main injection in terms of crank angle or time (i.e., occurs closer to combustion and power stroke where the exhaust valve is not open) and that extra injection of fuel burns inside the cylinder to heat up the exhaust gas leaving the engine.

An additional way to control temperatures is called the far post injection, which occurs much later in the combustion cycle (i.e., closer to the exhaust stroke). Far post injection does not burn inside the cylinder, but instead, the fuel is expunged along with its own gasses and burns outside on a different catalyst (i.e., a diesel oxidation catalyst (DOC)). Far post injection occurs downstream and thus, is used to raise the temperature of downstream devices, such as the diesel particulate filter (DPF) for purposes of regeneration, for instance.

An intake system is configured to deliver air to a cylinder where the air is mixed with fuel for combustion. In some engine systems, the intake system combines ambient air with air from a turbocharger. Air from the turbocharger is generally hotter than ambient air, and the intake system can combine air from the two sources in various amounts to achieve a desired temperature of the intake air (i.e., charge air). A higher charge air temperature lead to a higher exhaust gas temperature.

According to the present disclosure and as described in more detail herein, a system and method of operating an engine system based on various operating conditions of the engine system is utilized to reduce unwanted emissions. A controller is coupled to an aftertreatment system heater, the engine, and other components of the system. In operation, the controller utilizes various thresholds indicative of a determined or estimated temperature of exhaust gas to determine whether to initiate certain actions to increase the exhaust gas temperature. Based on a comparison, the controller may alter/change operation of one or more of the various engine systems to increase the temperature of the exhaust gas and reduce the amount of harmful emissions released to the environment.

One of the thresholds may include a temperature of the exhaust gas. If the controller determines that a temperature of the exhaust gas is lower than a predetermined threshold temperature, the controller may operate one or more systems to increase the temperature of the exhaust gas. Another threshold may include an efficiency level of the engine. If the controller determines that an efficiency of the engine is lower than a threshold level, the controller may operate one or more systems to increase the temperature of the exhaust gas. Another one of the thresholds may include an amount of particulate matter present in the exhaust gas. If the controller determines that the amount of particulate matter present in the exhaust gas is higher than a threshold amount, the controller may operate one or more systems to increase the temperature of the exhaust gas. Yet another threshold may include an amount of oxygen present in the exhaust gas, which is indicative of the amount of harmful emissions present in the exhaust gas. If the controller determines that the amount of oxygen present in the exhaust gas is lower than a threshold amount the controller may operate one or more systems to increase the temperature of the exhaust gas.

It should be understood that while the description and Figures herein are primarily directed to systems and methods to reduce emissions by operating various systems within a vehicle, this description is not meant to be limiting. The systems and methods described herein are also applicable to accomplish other effects within a vehicle.

Referring now to FIG. 1, an illustration of a controller 122 coupled to the vehicle 100 is shown, according to an exemplary embodiment. The vehicle 100 may include an on-road or an off-road vehicle including, but not limited to, line-haul trucks, mid-range trucks (e.g., pick-up trucks), cars, boats, tanks, airplanes, locomotives, mining equipment, and any other type of vehicle that may utilize systems to reduce emissions. The vehicle 100 may include a powertrain system, a fueling system, an operator input/output device, one or more additional vehicle subsystems, etc. The vehicle 100 may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

The engine system 102 is structured as a compression-ignition internal combustion engine that utilizes diesel fuel. However, in various alternate embodiments, the engine system 102 may be structured as any other type of engine (e.g., spark-ignition) that utilizes any type of fuel (e.g., gasoline, natural gas). In still other example embodiments, the engine system 102 may be or include an electric motor (e.g., a hybrid drivetrain). The engine system 102 includes one or more cylinders and associated pistons. Air from the atmosphere is combined with fuel, and combusted, to power the engine system 102. Combustion of the fuel and air in the compression chambers of the engine system 102 produces exhaust gas that is operatively vented to an exhaust pipe and to the aftertreatment system.

The vehicle 100 is shown to include the engine system 102, a CDA system 104, an intake system 106, a power system 108, an aftertreatment system heater 110 coupled to an aftertreatment system, an exhaust gas recirculation ("EGR") system 112, a fuel injection system 114, a hydrocarbon ("HC") dosing system 116, and a charge air cooler ("CAC") system 118, and sensors 120.

In various embodiments, the CDA system 104 is coupled to the cylinders of the engine system 102 and is configured to operate the cylinders of the engine system 102 in any of the CDA operating modes described herein. In some embodiments, the CDA system 104 operates the cylinders in fixed cylinder CDA mode to deactivate the same cylinders each time the engine system 102 operates in fixed cylinder CDA mode. In some embodiments, the CDA system 104 operates the cylinders in skip-fire CDA mode to deactivate and/or activate each cylinder at each combustion opportunity (e.g., each firing opportunity). Still other embodiments include a combination of fixed cylinder CDA and skip-fire CDA. In an example embodiment where the engine system 102 includes eight cylinders, the CDA system 104 may operate the cylinders in a skip-fire CDA mode and deactivate cylinders one and two at the first firing opportunity while leaving cylinders three through eight active. At the second firing opportunity, the CDA system 104 may activate cylinders one and two and keep cylinders three and four active, while deactivating cylinders five through eight. Accordingly, the CDA system 104 can deactivate/activate any combination of cylinders within the engine system 102 based on a goal or threshold. In some instances, the CDA system 104 operates based on a goal of reducing emissions released to the environment.

The CDA system 104 includes various components, systems, or actuators to deactivate and activate the cylinders of the engine system 102. In an example embodiment, the CDA system 104 includes one or more oil control solenoids that control a flow of oil to a coupling mechanism that is coupled to an intake valve of a cylinder. The coupling mechanism is also coupled to a cam that is coupled to a camshaft of the engine. As the cam contacts the coupling mechanism, the coupling mechanism transmits the motion of the cam to the intake valve to open and close the intake valve. When the oil control solenoid is inactive, pressurized oil is directed to the coupling mechanism to maintain operation of the coupling mechanism as described. When the oil control solenoid is activated (e.g., when the engine is operating in a CDA mode), the oil control solenoid prevents pressurized oil from reaching the coupling mechanism, and the coupling mechanism is decoupled from the cam. Therefore, the motion of the cam is not transmitted to the intake valve, and the intake valve remains closed, preventing air from entering the cylinder. One of ordinary skill will understand that the mechanism described is one way in which a cylinder can be deactivated when an engine is operating in a CDA mode. Various other methods of deactivating a cylinder can also be used, and any available method of deactivating a cylinder can be used with the implementations described herein.

In some implementations, the CDA system 104 also deactivates an exhaust valve associated with the intake valve in a manner similar to that described with respect to the intake valve. During normal engine operation, the exhaust valve opens after combustion has occurred to release the fumes from combustion (e.g., the exhaust gas) to an exhaust system. To prevent unnecessary wear and tear on the exhaust valve, the CDA system 104 may also decouple the exhaust valve from the camshaft when the cylinder is deactivated.

When operating in CDA mode, the active cylinders operate to cause the engine system 102 to produce the same amount of work as the engine system 102 produces when all cylinders are active. For example, if the engine system 102 produces enough work to cause a vehicle to travel at sixty miles per hour when all cylinders are active, to maintain the vehicle traveling at sixty miles per hour with some cylinders deactivated when operating in CDA mode, the active cylinders must produce more work than they had been producing when not operating in CDA mode. A result of each active cylinder producing more work is more heat produced by each active cylinder, resulting in an increase in temperature of the exhaust gas. Furthermore, because fewer cylinders are active when the engine system 102 operates in CDA mode, the flow of exhaust gas decreases, resulting in higher exhaust temperatures because less heat is lost from the flow of the exhaust gas.

Accordingly, in some embodiments the CDA system 104 can be used to increase the temperature of the exhaust gas. For example, in various instances the temperature of the exhaust gas may be too low for the catalysts in an aftertreatment system (e.g., catalysts within the DOC and/or the SCR) to operate efficiently and remove harmful emissions from the exhaust gas. In such instances, the CDA system 104 may deactivate one or more cylinders of the engine system 102 to increase the temperature of the exhaust gas to above a threshold temperature (e.g., 200° C.) thereby increasing the effectiveness and efficiency of the aftertreatment system. After the exhaust gas reaches a target temperature (e.g., a temperature greater than the threshold temperature by a certain amount), the CDA system 104 may activate one or more of the deactivated cylinders. In some embodiments, the threshold temperature is a predetermined temperature (e.g., the threshold temperature is determined prior to implementing any of the systems or methods disclosed herein). The threshold temperature can also be determined based on various operating conditions of the engine (e.g., engine load, engine speed, etc.) on a dynamic bases (e.g., the threshold temperature can change based on current operating conditions of the engine).

In some embodiments, the CDA system 104 is configured to deactivate one or more cylinders when the NVH operating ranges of the vehicle 100 are acceptable. As referenced herein, the term "NVH operating range(s)" refers to characteristics regarding the noise, vibration, and harshness ("NVH") associated with operation of the engine system 102. Continuously changing the number of active/inactive cylinders during engine operation (e.g., by implementing the CDA system 104) can negatively impact NVH (e.g., increase the NVH). Accordingly, in some embodiments the CDA system 104 may not be implemented when the NVH of the engine system is unacceptable, as implementing the CDA system 104 in such circumstances may cause the NVH to become worse. In some embodiments, the NVH of the engine system 102 is compared to an NVH threshold to determine whether the NVH of the engine system 102 is acceptable. Various operating parameters of the engine system 102 contribute to the NVH. Examples of the operating parameters include, but are not limited to, an engine speed, engine torque, engine load, etc.

The intake system 106 is coupled to the cylinders of the engine system 102. The intake system 106 is configured to direct air to the cylinders of the engine system 102 to be mixed with fuel for combustion. When the intake system 106 directs ambient air into the cylinders, the air entering the cylinders is substantially the same temperature as the temperature of the ambient air. When the intake system 106 directs air from a turbocharger (i.e., "charge air") to the cylinders, the air entering the cylinders is substantially the same temperature as the temperature of the charge air. Because a turbocharger operates to compress ambient air to generate the charge air, the temperature of the charge air is higher than the air entering the turbocharger (e.g., ambient air). In some embodiments, the intake system 106 directs a mix of ambient air and charge air into the cylinder, where the amounts of each of the ambient air and the charge air are determined based on a desired temperature. The temperature of the air in the cylinder prior to combustion is directly related to the temperature of the exhaust gas. For example, air at a relatively low temperature in the cylinder will result in relatively low exhaust temperature, and air at a relatively higher temperature in the cylinder will result in relatively high exhaust temperature compared to the exhaust temperature achieved with a lower temperature charge air.

In various embodiments, the temperature of the air entering the cylinders of the engine system 102 may be below a threshold temperature such that the temperature of the exhaust gas is too low (e.g., below 200° C.) for the aftertreatment system to remove harmful emissions. In such embodiments, additional systems may be coupled to, or used with, the intake system 106 to increase the temperature of the air entering the cylinders of the engine system 102. For example, air can be forced through an intake heater to increase the temperature of the air to above the threshold temperature before the air is directed into the cylinders. After the exhaust gas reaches a target temperature (e.g., a temperature greater than the threshold temperature by a certain amount), the intake heater may be turned off or the power directed to the intake heater may be reduced.

The power system 108 can include one or more of a battery and an alternator and is configured to provide electrical power to various systems and components in a vehicle that require electrical power. The battery is configured to provide power to the various systems and components (e.g., the aftertreatment system heater 110) when the vehicle is on (e.g., the engine system 102 is running) and when the vehicle is off (e.g., the engine system 102 is not running). The alternator is configured to provide power to the various electrical systems and components when the vehicle is on. The alternator is also configured to charge the battery when the vehicle is running.

The power available in the battery and the alternator can be determined based on a variety of factors. For example, both the battery and the alternator of the power system 108 have a maximum charge level (e.g., the maximum amount of power that can be stored) and an actual charge level (e.g., the amount of power stored at a given time). In some embodiments, the actual charge level can be a percentage of the maximum charge level. During operation of the vehicle, the actual charge levels of both the battery and the alternator vary as the vehicle 100 consumes power. For example, the CDA system 104 uses power from either the battery or the alternator to deactivate and/or activate the cylinders of the engine system 102 during each cycle. Each of the systems comprising the vehicle 100 has a threshold level of power required for the system to operate. The threshold level of power is also referred to as sufficiency of charge (SOC). If the SOC of the battery and the alternator is lower than the threshold level of power, the system cannot operate. For example, the aftertreatment system heater 110 may require a certain SOC (e.g., at least 50%) to heat exhaust gas to a desired temperature. If the actual SOC of either the battery or the alternator exceeds the threshold power level (e.g., the SOC is greater than or equal to 50%), the aftertreatment system heater 110 can operate. If, on the other hand, the SOC of the battery and the alternator is lower than the threshold power level (e.g., the SOC is less than 50%), the aftertreatment system heater 110 cannot operate.

As another example, a temperature of the battery and/or the alternator may indicate the amount of power available. If the temperature of the battery and/or the alternator is lower than a minimum threshold temperature, the amount of power available may be low. In addition, if the temperature of the battery and/or the alternator is higher than a maximum threshold temperature, the amount of power may be low. Accordingly, the temperature of the battery and/or the alternator may need to be within a target temperature range to provide sufficient power.

The aftertreatment system heater 110 is coupled to the aftertreatment system and is configured to increase the temperature of the exhaust gas flowing through the aftertreatment system. Raising the temperature of the exhaust gas with the aftertreatment system heater 110 increases the efficiency of one or more catalysts of the aftertreatment system. The aftertreatment system heater 110 may be a grid heater, a heater within the SCR system, an induction heater, a microwave heater, or a fuel burner.

A grid heater may include an electrically conductive mesh structure configured to fit within the flow of the exhaust gas that allows the exhaust gas to flow through the mesh structure. The mesh structure can be, for example, a resistive heater that increases in temperature when coupled to an electric power source (e.g., the power system 108). The grid heater heats the gas, which in turn transfers heat to a catalyst of the aftertreatment system. As the exhaust gas flows through the grid heater, the temperature of the exhaust gas increases via convection.

A heater within the SCR system may include an electric heater embedded within, or otherwise coupled to, the catalyst substrate. The electric heater may be a resistive heater or any other type of suitable electric heater capable of heating the exhaust gas as it flows through the SCR system.

An induction heater may include an electrically conductive structure configured to fit within the flow of the exhaust gas that allows the exhaust gas to flow through or around the structure. The structure is coupled to an electromagnet connected to a power source. The power source induces a high-frequency alternating current through the electromagnet, which generates current through the structure, causing the structure to heat up. As exhaust gas flows through the structure, the temperature of the exhaust gas increases via convection.

A microwave heater may include an electromagnetic radiation source in communication with the exhaust gas. The electromagnetic radiation source may rapidly vary electric and magnetic fields, causing the exhaust gas to increase in temperature.

A fuel burner may include an ignition source in communication with the exhaust gas configured to ignite unburned fuel in the exhaust gas. Igniting the unburned fuel present in the exhaust gas causes the exhaust gas to increase in temperature.

In some embodiments, performance of the aftertreatment system heater 110 is a function of a flow rate of exhaust gas. When the CDA system 104 is operating, the flow rate of exhaust gas may decrease based on the reduction of active cylinders. Accordingly, to maintain a flow rate of exhaust gas through the aftertreatment system heater 110 when the CDA system 104 is operating, a speed of the engine may be increased.

In some embodiments, operation of the CDA system 104 may be limited to maintain a minimum exhaust gas flow rate in lieu of changing a speed of the engine. For example, the CDA system 104 deactivate fewer cylinders than an optimal number of cylinders to deactivate so the flow rate of exhaust gas remains above a predetermined minimum exhaust gas flow rate.

In various instances, the temperature of the air entering the cylinders of the engine system 102 may be below a threshold temperature such that the temperature of the exhaust gas is too low (e.g., below 200° C.) for the aftertreatment system to remove harmful emissions. In other instances, an amount of harmful emissions reduced or eliminated is below a threshold level (e.g., the aftertreatment system is not operating as efficiently as desired). In such instances, the aftertreatment system heater 110 can be activated to heat the exhaust gas, thereby increasing the temperature of the exhaust gas. After the exhaust gas reaches a target temperature (e.g., a temperature greater than the threshold temperature by a certain amount), the aftertreatment system heater 110 may be turned off or the power directed to the aftertreatment system heater 110 may be reduced.

The EGR system 112 coupled to the engine system 102 and the aftertreatment system and is configured to direct a portion of the exhaust gas back into the cylinders of the engine system 102, where the exhaust gas is mixed with air from the intake system 106 for combustion. The EGR system 112 operates to reduce the combustion temperature in the cylinders by diluting the amount of oxygen from the intake system 106. The reduction in combustion temperature reduces the exhaust temperature, which reduces NOx formation from combustion. In various embodiments, the engine system 102 includes an EGR bypass valve that can be positioned in an open configuration and a closed configuration. In the open configuration, the EGR bypass valve directs at least a portion of the exhaust gas back to the cylinders of the engine system 102, as described. In the closed configuration, the EGR bypass valve directs all of the exhaust gas to the aftertreatment system without going back through the cylinders.

In various instances, the temperature of the air entering the cylinders of the engine system 102 may be below a threshold temperature such that the temperature of the exhaust gas may be too low (e.g., below 200° C.) for a catalyst of the aftertreatment system to remove harmful emissions. In other instances, an amount of harmful emissions reduced or eliminated is below a threshold level (e.g., the aftertreatment system is not operating as efficiently as desired). In such instances, the EGR bypass valve can be moved to the closed configuration to prevent exhaust gas from entering the cylinders, thereby increasing the temperature of the exhaust gas. After the exhaust gas reaches a target temperature (e.g., a temperature greater than the threshold temperature by a certain amount), the EGR bypass valve may be moved to the open position to direct at least some of the exhaust gas toward the cylinders.

The fuel injection system 114 is coupled to the engine system 102 and is configured to direct fuel into the cylinders of the engine system 102 to mix with air from the intake system 106 and provide for combustion within the cylinders. The timing of the fuel injection (e.g., at which point during the cylinder cycle the fuel is injected into the cylinder) can be modified to accomplish various goals. For example, injecting fuel at an optimal time in the cycle results in complete combustion of the fuel, resulting in maximum energy obtained from the combustion event. As another example, injecting fuel into the cylinder late in the cycle can result in a non-homogeneous fuel/air mixture, which can lead to a lower efficiency mix causing incomplete combustion. Incomplete combustion can lead to more heat being released to the exhaust gas, thereby increasing the temperature of the exhaust gas.

Accordingly, in embodiments where the temperature of the exhaust gas is lower than a threshold temperature such that the temperature of the exhaust gas is too low (e.g., below 200° C.) for the aftertreatment system to remove harmful emissions, the timing of fuel injection can be delayed to increase the temperature of the exhaust gas. Furthermore, in embodiments where an amount of harmful emissions reduced or eliminated is below a threshold level (e.g., the aftertreatment system is not operating as efficiently as desired), the timing of fuel injection can be delayed, thereby increasing the temperature of the exhaust gas to increase the efficiency of the aftertreatment system. After the exhaust gas reaches a target temperature (e.g., a temperature greater than the threshold temperature by a certain amount), the fuel injection timing may be changed to the optimal injection time.

The HC dosing system 116 coupled to the aftertreatment system and is configured to introduce fuel into the exhaust gas before the exhaust gas flows through the DPF. Introducing fuel into the exhaust gas in this manner serves to increase the temperature of the exhaust gas, which provides for more efficient regeneration of the DPF.

In instances where an amount of harmful emissions reduced or eliminated is below a threshold level (e.g., the aftertreatment system is not operating as efficiently as desired), the HC dosing system 116 can inject fuel into the exhaust gas, thereby increasing the temperature to increase the efficiency of the aftertreatment system. After the exhaust gas reaches a target temperature (e.g., a temperature greater than the threshold temperature by a certain amount), the HC dosing system 116 may be turned off or the power directed to the HC dosing system 116 may be reduced.

The CAC system 118 is coupled to the intake system 106 and the engine system 102 and is configured to reduce a temperature of charge air from a turbocharger. Reducing the temperature of the charge air prior to the charge air entering the cylinders can provide for more efficient combustion, leading to more power from combustion than if the charge air is not cooled. In various embodiments, the engine system 102 includes a CAC bypass valve that can be positioned in an open configuration and a closed configuration. In the open configuration, the CAC bypass valve directs the charge air to the cylinders of the engine system 102, as described. In the closed configuration, the CAC bypass valve directs all of the exhaust gas to the charge air cooler to reduce the temperature of the charge air.

In various instances, the temperature of the air entering the cylinders of the engine system 102 may be below a threshold temperature such that the temperature of the exhaust gas is too low (e.g., below 200° C.) for the aftertreatment system to remove harmful emissions. In other instances, an amount of harmful emissions reduced or eliminated is below a threshold level (e.g., the aftertreatment system is not operating as efficiently as desired). In both instances, the CAC bypass valve can be moved to the open configuration to direct charge air to the cylinders without going through the charge air cooler, thereby increasing the temperature of the exhaust gas. After the exhaust gas reaches a target temperature (e.g., a temperature greater than the threshold temperature by a certain amount), the CAC bypass valve can be moved to the closed configuration to direct charge air through the CAC system 118.

The sensors 120 are coupled to the controller 122 and to one or more of the systems of the vehicle 100. The sensors are configured to detect and/or determine values associated with various properties of the vehicle 100. Accordingly, the sensors 120 may include one or more of a temperature sensor (e.g., a thermocouple, a resistance temperature detector, etc., to determine a temperature of the exhaust gas), a particulate matter sensor (e.g., to determine the amount of particulate matter in the exhaust gas), an emission sensor (e.g., to determine a proportion of oxygen and nitrous oxides in the exhaust gas, which is indicative of the level of harmful emissions in the exhaust gas and thus the efficiency of the engine), a power sensor (e.g., a voltmeter), a vibration sensor, and a noise sensor. In some embodiments, the sensors 120 are combined into a single sensor. In some embodiments, the sensors 120 are separate sensors. In some embodiments, a plurality of sensors (e.g., a plurality of temperature sensors, a plurality of particulate matter sensors, and/or a plurality of emission sensors) may be used.

The controller 122 is coupled to the vehicle 100 and is configured to at least partly control the operation of the vehicle 100. The controller 122 is further described with reference to FIG. 2.

Figure 2:
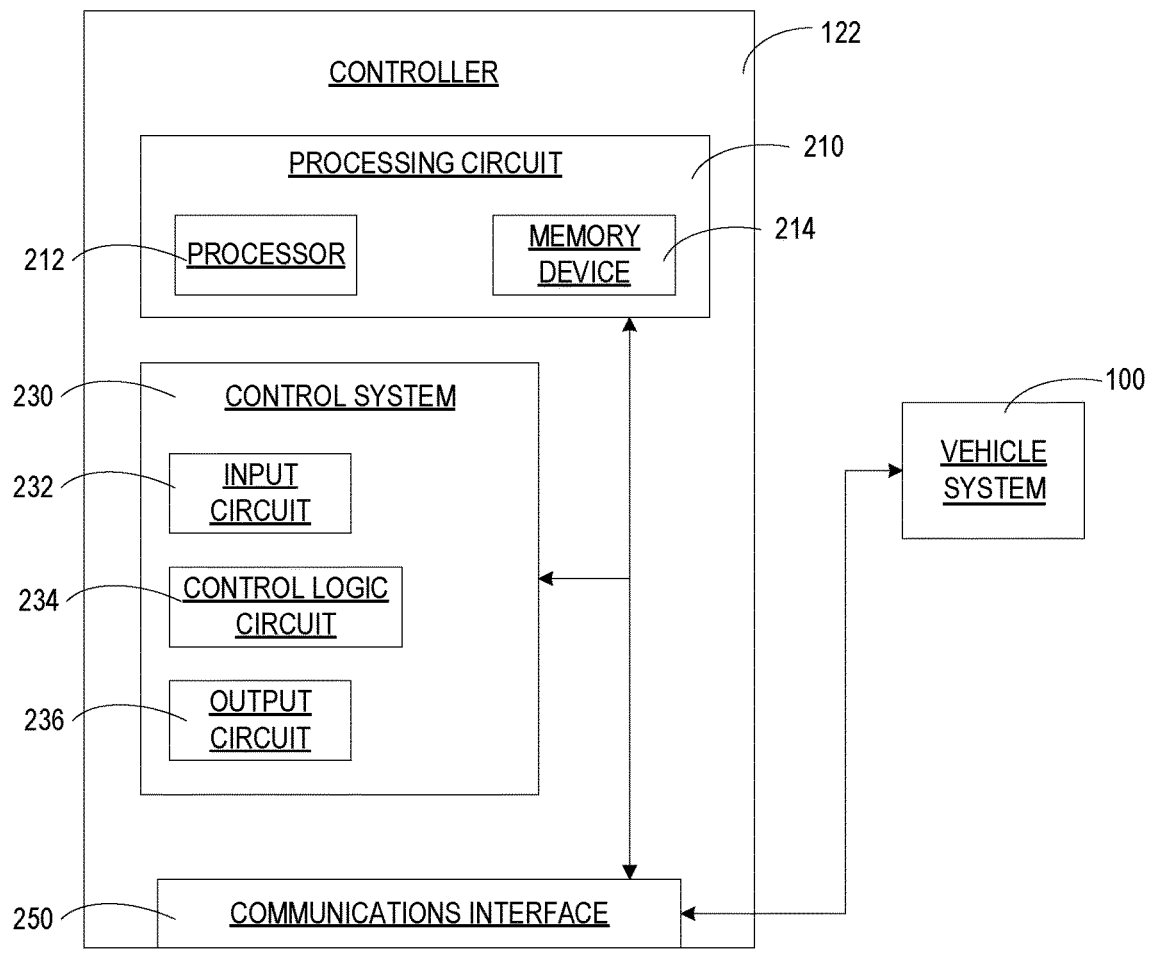
FIG. 2 is a schematic diagram of the controller of FIG. 1, according to an exemplary embodiment.

FIG. 2 is a schematic diagram of the controller 122 of FIG. 1, according to an exemplary embodiment. The controller 122 is structured to receive inputs (e.g., signals, information, data, etc.) from the vehicle 100. Thus, the controller 122 is structured to control, at least partly, the vehicle 100. As the components of FIG. 2 can be embodied in a vehicle, the controller 122 may be structured as one or more electronic control units (ECU). The controller 122 may be separate from or included with at least one of a transmission control unit, an exhaust aftertreatment control unit, a powertrain control module, an engine control module, etc.

As shown, the controller 122 includes a processing circuit 210 having a processor 212 and a memory device 214, a control system 230 having an input circuit 232, a control logic circuit 234, an output circuit 236, and a communications interface 250.

In one configuration, the input circuit 232, the control logic circuit 234, and the output circuit 236 are embodied as machine or computer-readable media that is executable by a processor, such as processor 212 and stored in a memory device, such as memory device 214. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 232, the control logic circuit 234, and the output circuit 236 are embodied as hardware units, such as electronic control units. As such, the input circuit 232, the control logic circuit 234, and the output circuit 236 may be embodied as one or more circuitry components including, but not limited to, processing circuitry, network interfaces, peripheral devices, input devices, output devices, sensors, etc. In some embodiments, the input circuit 232, the control logic circuit 234, and the output circuit 236 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 232, the control logic circuit 234, and the output circuit 236 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 232, the control logic circuit 234, and the output circuit 236 may also include programmable hardware devices such as field programmable gate arrays, programmable array logic, programmable logic devices or the like. The input circuit 232, the control logic circuit 234, and the output circuit 236 may include one or more memory devices for storing instructions that are executable by the processor (s) of the input circuit 232, the control logic circuit 234, and the output circuit 236. The one or more memory devices and processor(s) may have the same definition as provided below with respect to the memory device 214 and processor 212. In some hardware unit configurations, the input circuit 232, the control logic circuit 234, and the output circuit 236 may be geographically dispersed throughout separate locations in, for example, a vehicle. Alternatively and as shown, the input circuit 232, the control logic circuit 234, and the output circuit 236 may be embodied in or within a single unit/housing, which is shown as the controller 122.

In the example shown, the controller 122 includes the processing circuit 210 having the processor 212 and the memory device 214. The processing circuit 210 may be structured or configured to execute or implement the instructions, commands, and/or control processes described herein with respect to the input circuit 232, the control logic circuit 234, and the output circuit 236. The depicted configuration represents the input circuit 232, the control logic circuit 234, and the output circuit 236 as machine or computer-readable media that may be stored by the memory device. However, as mentioned above, this illustration is not meant to be limiting as the present disclosure contemplates other embodiments where the input circuit 232, the control logic circuit 234, and the output circuit 236, or at least one circuit of the input circuit 232, the control logic circuit 234, and the output circuit 236, is configured as a hardware unit. All such combinations and variations are intended to fall within the scope of the present disclosure.

The processor 212 may be a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Accordingly, the processor 212 may be a microprocessor, a different type of processor, or state machine. The processor 212 also may be implemented as a combination of computing devices, such as a combination of a DSP and a microprocessor, a plurality of microprocessors, one or more microprocessors in conjunction with a DSP core, or any other such configuration. In some embodiments, the processor 212 may two or more processors that may be shared by multiple circuits (e.g., the input circuit 232, the control logic circuit 234, and the output circuit 236 may comprise or otherwise share the same processor which, in some example embodiments, may execute instructions stored, or otherwise accessed, via different areas of memory). Alternatively or additionally, the processors may be structured to perform or otherwise execute certain operations independent of the other co-processors. In other example embodiments, the processors may be coupled via a bus to enable independent, parallel, pipelined, or multi-threaded instruction execution. All such variations are intended to fall within the scope of the present disclosure.

The memory device 214 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 214 may be coupled to the processor 212 to provide computer code or instructions to the processor 212 for executing at least some of the processes described herein. Moreover, the memory device 214 may be or include tangible, non-transient volatile memory or non-volatile memory. Accordingly, the memory device 214 may include database components, object code components, script components, or any other type of information structure for supporting the various activities and information structures described herein.

The input circuit 232 is structured to receive information from the vehicle 100 via the communications interface 250. In some arrangements, the information generated by the vehicle 100 is sent to the control logic circuit 234 wirelessly (e.g., the sensors include a wireless transmitter to transmit information and the control logic circuit 234 includes a wireless receiver to receive the information). The information generated by the vehicle 100 can also be sent to the control logic circuit 234 via a wired connection. The input circuit 232 may modify or format the sensor information (e.g., via analog/digital converter) so that the sensor information can be readily used by the control logic circuit 234. In some embodiments, the sensor information may include the temperature of the exhaust gas. In some embodiments, the sensor information may include an amount of particulate matter present in the exhaust gas. In some embodiments, the sensor information may include an amount of oxygen present in the exhaust gas. In some embodiments, the sensor information may include a SOC or temperature of one or more components of the power system 108.

The control logic circuit 234 is structured to receive information regarding the vehicle 100 from the input circuit 232 and to determine one or more operation strategies based on the information. For example, the control logic circuit 234 can determine whether the vehicle should operate in CDA mode (e.g., fixed cylinder CDA mode or skip-fire CDA mode) to increase exhaust gas temperature, whether an aftertreatment system heater should be activated to increase exhaust gas temperature, and whether any other actions should be taken to increase exhaust gas temperature. As used herein, "control parameters" refer to values or information determined within the control logic circuit 234 by the embedded control logic, model, algorithm, or other control scheme. The control parameters may include values or information that represents a status or a state of a vehicle system, a predictive state information, or any other values or information used by the control logic circuit 234 to determine what the controller 122 should do or what the outputs should be.

For a CDA system (e.g., the CDA system 104), a complex control scheme balances requirements to meet a requested torque demand at an optimum fuel efficiency, while assuring reliable operation of inactive cylinders after those cylinders are activated and a desirable exhaust gas temperature. In order to control the technology to meet these requirements, "control parameters" are utilized to monitor the current state of the components and how to adjust the actuators. Control parameters refer to NVH operating conditions, relative use of cylinders (e.g., how often a first cylinder is deactivated compared to a second cylinder), absolute use of cylinders (e.g., the number of consecutive cycles in which a cylinder is inactive, active, etc.), etc.

In some embodiments, the control logic circuit 234 includes algorithms or traditional control logic (e.g., PIDs, etc.). In some embodiments, the control logic circuit 234 includes modelling architecture for component integration or other model based logic (e.g., physical modelling systems that utilize lookup tables). In some embodiments, the control logic circuit 234 utilizes one or more lookup tables stored in the memory device 214 for determination of the control parameters. In some embodiments, the control logic circuit 234 may include artificial intelligence or machine learning circuits, or fuzzy logic circuits, as desired. In one embodiment, the control logic circuit 234 may receive a request related to increasing the temperature of the exhaust gas, and determine a control parameter in the form of activating or deactivating one or more cylinders, activating an aftertreatment heater, etc. In another embodiment, the control logic circuit 234 may receive a request related to increasing the temperature of the exhaust gas, and determine the control parameter is one or more thresholds related to characteristics of the vehicle 100.

The output circuit 236 is structured to receive the control parameters from the control logic circuit 234 and provide actuation information (e.g., the "output") to the vehicle 100 via the communications interface 250. In some embodiments, the output circuit 236 receives a threshold exhaust gas temperature from the control logic circuit 234 and outputs a signal to the CDA system 104 to activate if the actual exhaust gas temperature is less than the threshold exhaust gas temperature. In some embodiments, the output circuit 236 receives a threshold amount of particulate matter from the control logic circuit 234 and outputs a signal to the CDA system 104 to activate if the actual amount of particulate matter is greater than the threshold amount of particulate matter. In some embodiments, the output circuit 236 receives a threshold amount of oxygen in the exhaust gas from the control logic circuit 234 and outputs a signal to the CDA system 104 to activate if the actual amount of oxygen in the exhaust gas is less than the threshold amount.

According to various embodiments, the temperature of the exhaust gas may be determined by direct measurement or by proxy based on various operating parameters of the vehicle 100. To measure the temperature of the exhaust gas via direct measurement, one or more of the sensors 120 (e.g., thermocouples, etc.) coupled to the controller 122 may be placed in, on, or near the flow of the exhaust gas. Locations of the one or more sensors 120 can include, but are not limited to, at the inlet and/or outlet of the SCR system, at the inlet and/or outlet of the DPF, at the inlet and/or outlet of the turbocharger, and any other location that may provide the ability to directly measure the temperature of the exhaust gas. To determine or predict the temperature of the exhaust gas, the temperature of the exhaust gas may be estimated or determined by the controller 122 based on operating parameters such as the engine speed, the engine torque, and any other parameters associated with the engine system that may indicate the temperature of the exhaust gas (e.g., via one or more look-up tables, algorithms, etc. that correlate one or more operating parameters to exhaust gas temperature).

According to various embodiments, the amount of particulate matter in the exhaust gas may be determined by direct measurement or by proxy based on various operating parameters of the vehicle 100. To measure the amount of particulate matter in the exhaust gas via direct measurement, one or more of the sensors 120 (e.g., particulate matter sensors, etc.) coupled to the controller 122 may be placed in, on, or near the flow of the exhaust gas. To determine or predict the amount of particulate matter in the exhaust gas, the amount of particulate matter in the exhaust gas may be estimated or determined by the controller 122 based on operating parameters such as the engine speed, the engine torque, and any other parameters associated with the engine system that may indicate the amount of particulate matter in the exhaust gas (e.g., via one or more look-up tables, algorithms, etc. that correlate one or more operating parameters to particulate matter).

According to various embodiments, the amount of oxygen in the exhaust gas may be determined by direct measurement or by proxy based on various operating parameters of the vehicle 100. To measure the amount of oxygen in the exhaust gas via direct measurement, one or more of the sensors 120 (e.g., oxygen sensors, etc.) coupled to the controller 122 may be placed in, on, or near the flow of the exhaust gas. To determine or predict the amount of oxygen in the exhaust gas, the amount of oxygen in the exhaust gas may be estimated or determined by the controller 122 based on operating parameters such as the engine speed, the engine torque, and any other parameters associated with the engine system that may indicate the amount of oxygen in the exhaust gas (e.g., via one or more look-up tables, algorithms, etc. that correlate one or more operating parameters to the amount of oxygen in the exhaust gas).

According to various embodiments, the engine noise level may be determined by direct measurement or by proxy based on various operating parameters of the vehicle 100. To measure the engine noise level via direct measurement, one or more of the sensors 120 (e.g., noise sensors, etc.) coupled to the controller 122 may be placed in, on, or near the vehicle 100. For example, a noise sensor may be located in a cab of the vehicle 100 to measure the noise experienced by the driver and/or passengers. A noise sensor may also be located near an intake of the engine system 102 to measure the noise experienced by those located outside the cab of the vehicle 100. To determine or predict the noise level, the noise level may be estimated or determined by the controller 122 based on operating parameters such as engine speed, the engine torque, and any other parameters associated with the engine system 102 that may indicate the noise generated by the vehicle 100 (e.g., via one or more look-up tables, algorithms, etc. that correlate one or more operating parameters to the noise level).

In some embodiments, a baseline noise level is established. The baseline noise level can be a noise level (e.g., decibel level) associated with operating the engine system 102 at a predetermined engine speed (e.g., 1500 RPM, 2000 RPM, 2500 RPM, etc.). The baseline noise level can also be a predetermined threshold noise level. For example, a desirable noise level inside a cab of the vehicle 100 may be approximately 60 decibels (dB), which is the noise level associated with a conversation between people. As another example, a desirable noise level near an intake of the engine system 102 may be approximately 80 dB. According to various embodiments, noise levels of the engine system 102 are compared to a baseline noise level or a predetermined noise threshold. If the noise levels of the engine system 102 are lower than the baseline noise level or the predetermined noise threshold, the CDA system 104 can be activated.

According to various embodiments, the engine and/or vehicle vibration level may be determined by direct measurement or by proxy based on various operating parameters of the vehicle 100. To measure the engine and/or vehicle vibration level via direct measurement, one or more of the sensors 120 (e.g., vibration sensors, accelerometers, etc.) coupled to the controller 122 may be placed in, on, or near the vehicle 100 or other parts of the vehicle. For example, one or more accelerometers may be positioned on one or more components of the engine system 102 (e.g., a cylinder block, a cylinder head, etc.). One or more accelerometers may also be positioned on various components within a cab of the vehicle 100 (e.g., a steering wheel, a seat, etc.) to determine the vibrations experienced by a driver and/or passenger (which may be used to gauge discomfort experienced by an operator or passengers). To determine or predict the engine and/or vehicle vibration, the engine and/or vehicle vibration may be estimated or otherwise determined by the controller 122 based on operating parameters such as engine speed, the engine torque, and any other parameters associated with the engine system that may indicate the vibrations generated by the vehicle 100 (e.g., via one or more look-up tables, algorithms, etc. that correlate one or more operating parameters to engine or vehicle vibration).

In some embodiments, a baseline vibration level is established. The baseline vibration level can be a vibration level associated with operating the engine system 102 at a predetermined engine speed (e.g., 1500 RPM, 2000 RPM, 2500 RPM, etc.). The baseline vibration level can also be a predetermined threshold vibration level. According to various embodiments, vibration levels of the engine system 102 are compared to a baseline vibration level or a predetermined vibration threshold. If the vibration levels of the engine system 102 are lower than the baseline vibration level or the predetermined vibration threshold, the CDA system 104 can be activated.

According to various embodiments, the available power may be determined by direct measurement or by proxy based on various operating parameters of the vehicle 100. To measure the available power via direct measurement, one or more of the sensors 120 (e.g., voltmeter, etc.) coupled to the controller 122 may be placed in, on, or near the power system 108 or other parts of the vehicle. To determine or predict the available power, the available power may be estimated or determined by the controller 122 based on operating parameters such as engine speed, the engine torque, and any other parameters associated with the engine system that may indicate the available power in the vehicle 100 (e.g., via one or more look-up tables, algorithms, etc. that correlate one or more operating parameters to the available power).

Figure 3:
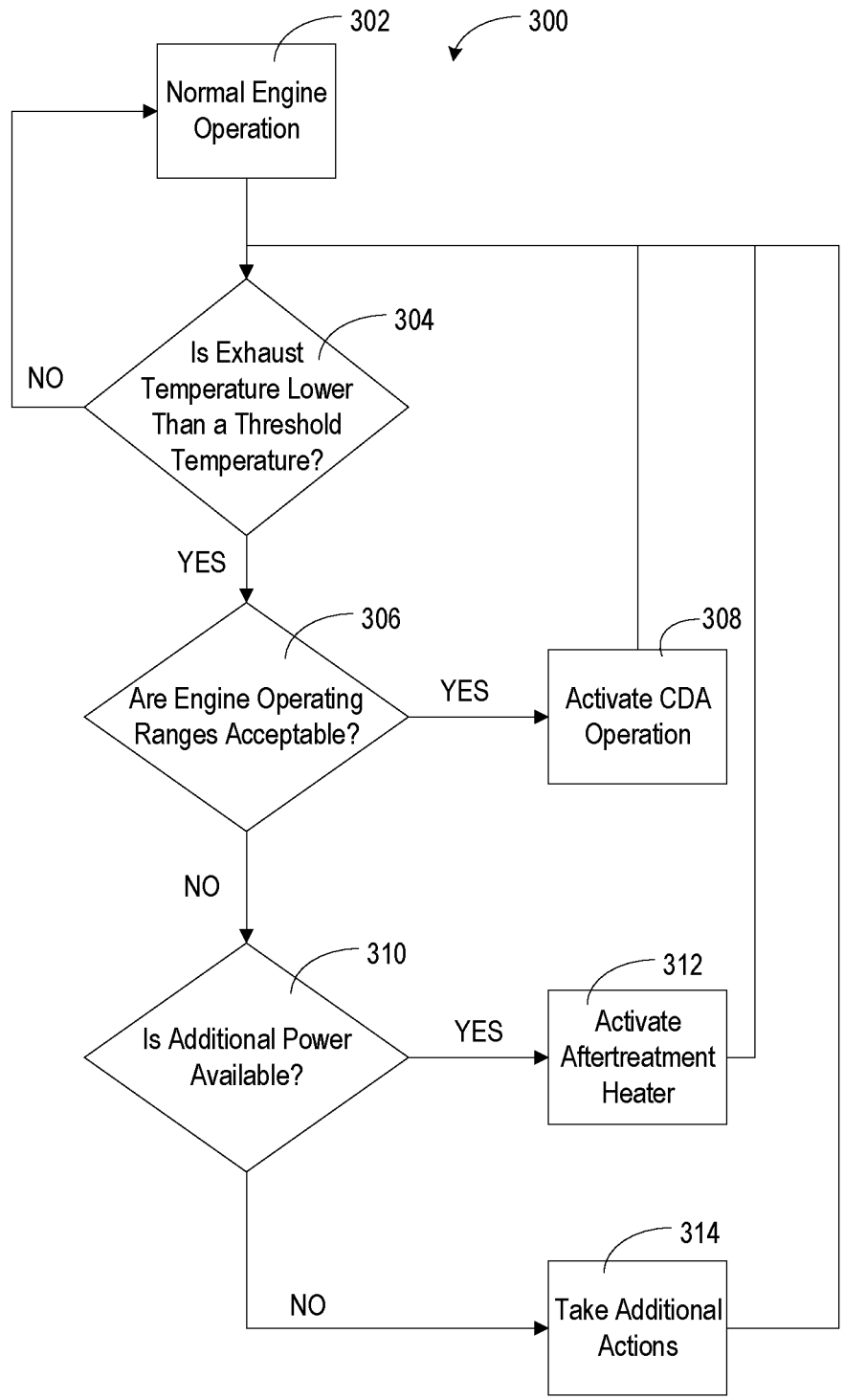
FIG. 3 is a flow diagram of a method to increase exhaust gas temperature under normal engine operating conditions by operating a cylinder deactivation system or a heater for an exhaust aftertreatment system, according to an exemplary embodiment.

FIG. 3 is a flow diagram of a method 300 to increase exhaust gas temperature under normal engine operating conditions by operating a cylinder deactivation system or a heater for an exhaust aftertreatment system, according to an exemplary embodiment. The method 300 may be implemented, at least in part, by the controller 122 such that reference is made to the controller 122 to aid in explanation of the method 300.

At 302, the engine is operated in a normal mode. As used herein, "normal operating mode" refers to all cylinders of the engine system 102 being used (e.g., the engine system 102 is operating in a non-CDA mode).

At 304, a determination is made as to whether the exhaust gas temperature is lower than a threshold temperature. In low load situations, for example when the vehicle is traveling at a slow speed, a low amount of power from the engine system 102 may be demanded, which results in lower exhaust gas temperatures, such as exhaust gas temperatures lower than the threshold temperature (e.g., approximately two hundred degrees Celsius). As described, the exhaust gas temperature may be determined directly. A direct measurement of the exhaust gas temperature may be achieved by, for example, providing a thermocouple that is coupled to the controller anywhere in the flow of the exhaust gas to enable a direct temperature measurement at that particular location or locations (e.g., before the exhaust gas flows through a turbocharger, after the exhaust gas exits a turbocharger, before the exhaust gas interacts with a catalyst, after the exhaust gas interacts with a catalyst such as an oxidation catalyst, SCR catalyst, etc., or at any other point in the flow of the exhaust gas). The exhaust gas temperature may also be determined or predicted. In various example embodiments, the controller 122 may determine or predict the approximate temperature of the exhaust gas based on one or more of the speed of the engine, the amount of time the engine has been running after start up (i.e., engine run time, which may be after particular conditions, such as engine run time following a cold start versus a not cold start), the amount of fuel that has burnt for a given time (i.e., cumulative fuel burned, which may be after various conditions such as following a cold-start condition), operation of the aftertreatment system heater 110 (e.g., heater run time, wattage, etc.), and so on. The controller 122 may also determine or predict the approximate temperature of the exhaust gas based on a temperature of a catalyst bed of the aftertreatment system. The temperature of the catalyst bed can be determined or measured directly by measuring a temperature of any catalysts within the flow of the exhaust gas (e.g., catalysts within the DOC catalysts within the DPF, catalysts within the SCR, etc.). The temperature of the catalyst bed can also be determined or predicted. In various example embodiments, the controller 122 may determine or predict the approximate temperature of the catalyst bed based on one or more of the speed of the engine, the amount of time the engine has been running, the amount of fuel that has been burnt after a certain condition, operation of the aftertreatment system heater 110 (e.g., run time, wattage, etc.), etc. (e.g., via one or more look-up tables, algorithms, etc. that correlate one or more operating parameters to the desired data point(s)/metric(s)). The controller 122 compares the temperature of the exhaust gas and/or the catalyst bed temperature to the threshold temperature to determine whether the temperature of the exhaust gas is lower than the threshold temperature. If the temperature of the exhaust gas is higher than the threshold temperature, the controller 122 directs the engine system 102 to continue operating in a normal mode.

If the temperature of the exhaust gas is lower than the threshold temperature, at 306, a determination is made as to whether the NVH operating ranges of the vehicle 100 are acceptable. If the NVH operating ranges of the vehicle 100 are acceptable (e.g., the NVH is acceptable), at 308 the controller 122 directs the CDA system 104 to operate to deactivate cylinders as needed. The cylinders can be deactivated to operate in a fixed cylinder CDA mode, a skip-fire CDA mode, or a combination thereof. As described, deactivating cylinders can increase the temperature of the exhaust gas. Accordingly, the controller 122 may direct the CDA system 104 to deactivate one or more cylinders based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the CDA system 104 to deactivate one cylinder. If the temperature of the exhaust gas is within a second range of the threshold temperature (e.g., within between twenty-six and fifty degrees of the threshold temperature), the controller 122 may direct the CDA system 104 to deactivate two cylinders. In some embodiments, the controller 122 may direct the CDA system 104 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

If the NVH operating ranges of the vehicle 100 are not acceptable, at 310 a determination is made as to whether additional power is available. For example, the controller 122 may determine, based on SOC the battery and/or the alternator, that additional power is available. Additionally or alternatively, the controller 122 may determine that a temperature of the battery and/or the alternator is greater than a minimum threshold temperature and lower than a maximum threshold temperature, indicating that additional power is available. If additional power is available, at 312 the aftertreatment system heater 110 is activated. As described, heating the exhaust gas with the aftertreatment system heater 110 can increase the temperature of the exhaust gas. Accordingly, the controller 122 may direct the aftertreatment system heater 110 to heat the exhaust gas based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the power system 108 to provide a first power level to the aftertreatment system heater 110 such that the heater reaches a first temperature. If the temperature of the exhaust gas is within a second range of the threshold temperature (e.g., within between twenty-six and fifty degrees of the threshold temperature), the controller 122 may direct the power system 108 to provide a second power level to the aftertreatment system heater 110 such that the aftertreatment system heater 110 reaches a second temperature that is higher than the first temperature. In some embodiments, the controller 122 may direct the aftertreatment system heater 110 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

As used herein, the term "firing fraction" refers to the fraction or percentage of cylinders that are active during a cylinder cycle for DSF or for a duration of CDA operating mode during fixed cylinder CDA. In some embodiments, the amount of power provided to the aftertreatment system heater 110 is based on a firing fraction implemented by the CDA system 104. For example, the CDA system 104 may deactivate one fourth of the cylinders in the engine system 102. In response, the power system 108 may provide power to the aftertreatment heater system 110 to utilize the heater at a first percentage of a full heating capacity of the aftertreatment system heater 110. As another example, the CDA system 104 may deactivate one half of the cylinders in the engine system 102. In response, the power system 108 may provide power to the aftertreatment heater system 110 to utilize the heater at a second percentage of a full heating capacity of the aftertreatment system heater 110, where the second percentage is lower than the first percentage. Accordingly, in some embodiments the percentage of power provided to the aftertreatment heater system 110 is proportional to the firing fraction implemented by the CDA system 104 (e.g., the power provided to the aftertreatment heater system 110 is increased as the firing fraction increases).

In some embodiments, the amount of power provided to the aftertreatment system heater 110 and the firing fraction are based on factors such as NVH, battery charge level, and fuel level. For example, the vehicle 100 may be operating such that the NVH operating ranges are not acceptable (and therefore, the CDA system 104 does not operate such that the firing fraction is 100%), but the temperature of the exhaust gas is determined to be increased. In such instances, the power system 108 may provide power to the aftertreatment system heater 110 as needed to increase the temperature of the exhaust gas to at least the threshold temperature. In addition, the vehicle 100 may be operating with a low fuel level. Accordingly, the CDA system 104 may be activated to conserve fuel by decreasing the firing fraction relative to a normal firing fraction for the CDA operating mode. In such instances, the power system 108 may provide less power to the aftertreatment heater system 110, as fewer active cylinders leads to an increase in exhaust gas temperature. Further, relatively higher amounts of battery charge level may correspond with more reliance on the aftertreatment heater system 110 and decreases to the firing fraction (less active cylinders).

In embodiments where there is a proportional relationship between the firing fraction and the power provided to the aftertreatment system heater 110, operation of the CDA system 104 and the aftertreatment system heater 110 may be coordinated based on an objective. Objectives include, but are not limited to, increasing a temperature of the exhaust gas, decreasing an amount of particulate matter present in the exhaust gas, and decreasing an amount of harmful emissions (e.g., NOR) present in the exhaust gas.

If additional power is not available, at 314 the controller 122 may take additional actions to increase the temperature of the exhaust gas. For example, the controller 122 may direct the power system 108 to provide power to an intake grid heater to increase the temperature of the air entering the cylinders, thereby increasing the temperature of the exhaust gas. The controller 122 may also direct the HC dosing system 116 to start injecting fuel into the exhaust gas to increase the temperature of the exhaust gas. Furthermore, the controller 122 may direct the fuel injection system 114 to inject fuel into the cylinder later, thereby increasing the temperature of the exhaust gas. The controller 122 may also direct the CAC bypass valve to the open position, thereby causing charge air to bypass the CAC system 118 and enter the cylinders at a higher temperature, thus increasing the temperature of the exhaust gas. Additionally, the controller 122 may direct the EGR bypass valve to the closed position, thereby preventing the recirculation of exhaust gas and increasing the temperature of the exhaust gas. The controller 122 can also increase a load on the engine (e.g., activating a generator, activating parasitic load devices, etc.), thereby increasing the temperature of the exhaust gas. In some embodiments, the controller 122 may direct the additional actions to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

In some embodiments, the additional actions described can be implemented by the controller 122 individually. In some embodiments, the additional actions described can be implemented by the controller 122 collectively (e.g., all of the additional actions are taken). In still other embodiments, the additional actions described can be taken by the controller 122 in various combinations of two or more actions.

Accordingly, by implementing the method 300 the temperature of the exhaust gas can be increased by either 1) operating the CDA system 104, 2) operating the aftertreatment system heater 110, or 3) taking additional actions.

Though the steps of the method 300 were described in a particular order, one of ordinary skill would understand that the steps of the method 300 can be implemented in any order to cause the desired effect of increasing the temperature of the exhaust gas.

Figure 4:
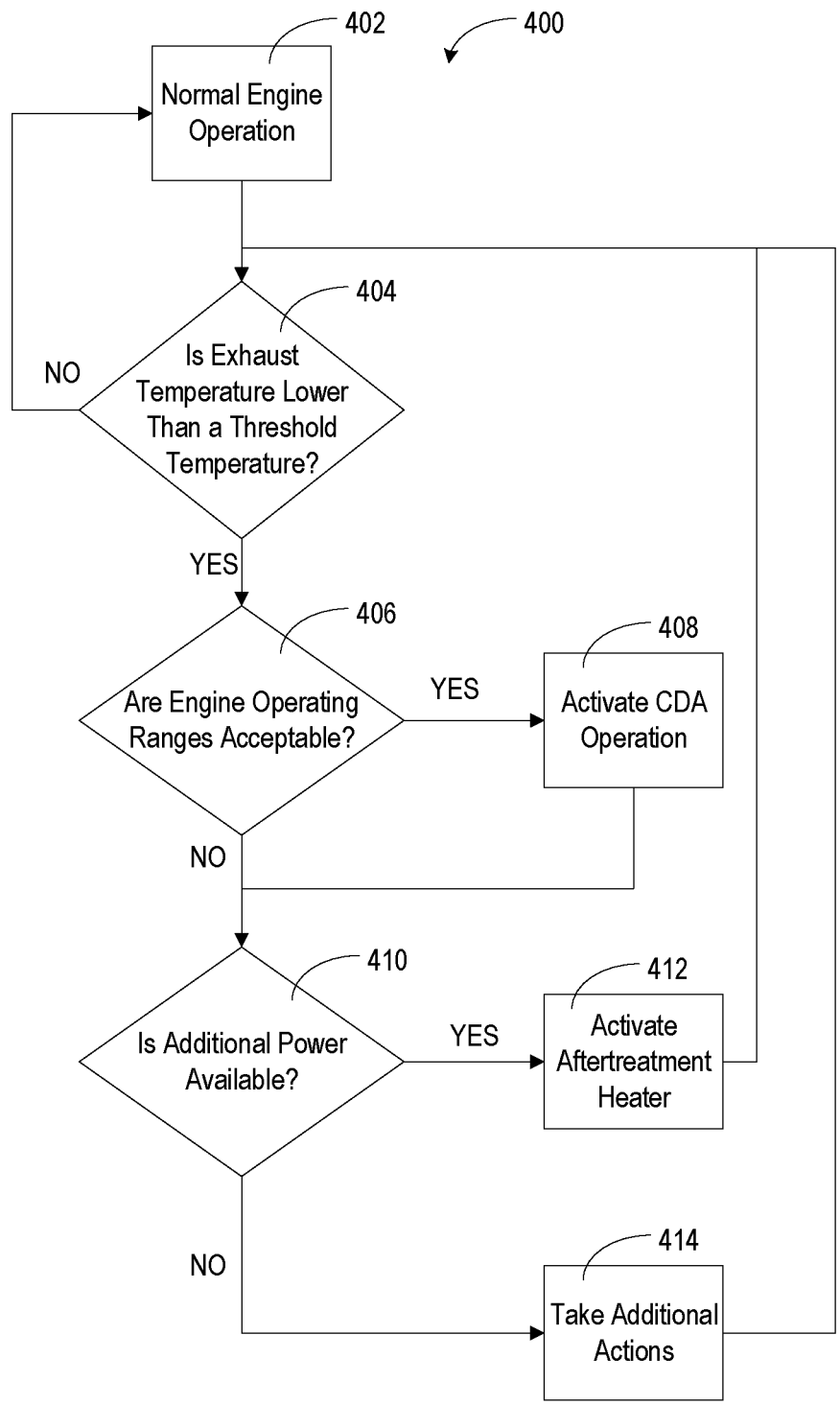
FIG. 4 is a flow diagram of a method to increase exhaust gas temperature under normal engine operating conditions by operating a cylinder deactivation system and/or a heater for an exhaust aftertreatment system, according to an exemplary embodiment.

FIG. 4 is a flow diagram of a method 400 to increase exhaust gas temperature under normal engine operating conditions by operating a cylinder deactivation system and/or a heater for an exhaust aftertreatment system, according to an exemplary embodiment. The method 400 may be implemented, at least in part, by the controller 122 such that reference is made to the controller 122 to aid in explanation of the method 400.

At 402, the engine is operated in a normal mode (e.g., non-CDA mode).

At 404, a determination is made as to whether the exhaust gas temperature is lower than a threshold temperature. In low load situations such as for example when the vehicle is traveling at a slow speed, a low amount of power from the engine system 102 may be demanded, which results in lower exhaust gas temperatures, such as exhaust gas temperatures lower than the threshold temperature (e.g., approximately two hundred degrees Celsius). As described, the exhaust gas temperature may be determined directly. A direct measurement of the exhaust gas temperature may be achieved by, for example, providing a thermocouple that is coupled to the controller. The thermocouple is provided anywhere in the flow of the exhaust gas to enable a direct temperature measurement at that particular location or locations (e.g., before the exhaust gas flows through a turbocharger, after the exhaust gas exits a turbocharger, before the exhaust gas interacts with a catalyst, after the exhaust gas interacts with a catalyst such as an oxidation catalyst, SCR catalyst, etc., or at any other point in the flow of the exhaust gas). The exhaust gas temperature may also be determined or predicted. In various example embodiments, the controller 122 may determine or predict the approximate temperature of the exhaust gas based on one or more of the speed of the engine, the amount of time the engine has been running after start up (i.e., engine run time, which may be after particular conditions, such as engine run time following a cold start versus a not cold start), the amount of fuel that has burnt for a given time period (i.e., cumulative fuel burned, which may be after various conditions such as following a cold-start condition), operation of the aftertreatment system heater 110 (e.g., heater run time, wattage, etc.), and so on. The controller 122 may also determine or predict the approximate temperature of the exhaust gas based on a temperature of a catalyst bed of the aftertreatment system. The temperature of the catalyst bed can be determined or measured directly by measuring a temperature of any catalysts within the flow of the exhaust gas (e.g., catalysts within the DOC catalysts within the DPF, catalysts within the SCR, etc.). The temperature of the catalyst bed can also be determined or predicted. In various example embodiments, the controller 122 may determine or predict the approximate temperature of the catalyst bed based on one or more of the speed of the engine, the amount of time the engine has been running, the amount of fuel that has been burnt after a certain condition, operation of the aftertreatment system heater 110 (e.g., run time, wattage, etc.), etc. (e.g., via one or more look-up tables, algorithms, etc. that correlate one or more operating parameters to the desired data point(s)/metric(s)). The controller 122 compares the temperature of the exhaust gas and/or the catalyst bed temperature to the threshold temperature to determine whether the temperature of the exhaust gas is lower than the threshold temperature. If the temperature of the exhaust gas is higher than the threshold temperature, the controller 122 directs the engine system 102 to continue operating in a normal mode.

If the temperature of the exhaust gas is lower than the threshold temperature, at 406 a determination is made as to whether the NVH operating ranges of the vehicle 100 are acceptable. If the NVH operating ranges of the vehicle 100 are acceptable, at 408 the controller 122 directs the CDA system 104 to operate to deactivate cylinders as needed. The cylinders can be deactivated to operate in a fixed cylinder CDA mode, a skip-fire CDA mode, or a combination thereof. As described, deactivating cylinders can increase the temperature of the exhaust gas. Accordingly, the controller 122 may direct the CDA system 104 to deactivate one or more cylinders based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the CDA system 104 to deactivate one cylinder. If the temperature of the exhaust gas is within a second range of the threshold temperature (e.g., within between twenty-six and fifty degrees of the threshold temperature), the controller 122 may direct the CDA system 104 to deactivate two cylinders. In some embodiments, the controller 122 may direct the CDA system 104 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

At 410, a determination is made as to whether additional power is available. For example, the controller 122 may determine, based on the SOC of the battery and/or the alternator, that additional power is available. Additionally or alternatively, the controller 122 may determine that a temperature of the battery and/or the alternator is greater than a minimum threshold temperature and lower than a maximum threshold temperature, indicating that additional power is available. If additional power is available, at 412 the aftertreatment system heater 110 is activated. As described, heating the exhaust gas with the aftertreatment system heater 110 can increase the temperature of the exhaust gas. Accordingly, the controller 122 may direct the aftertreatment system heater 110 to heat the exhaust gas based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the power system 108 to provide a first power level to the aftertreatment system heater 110 such that the heater reaches a first temperature. If the temperature of the exhaust gas is within a second range of the threshold temperature (e.g., within between twenty-six and fifty degrees of the threshold temperature), the controller 122 may direct the power system 108 to provide a second power level to the aftertreatment system heater 110 such that the aftertreatment system heater 110 reaches a second temperature that is higher than the first temperature. In some embodiments, the controller 122 may direct the aftertreatment system heater 110 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

In some embodiments, the amount of power provided to the aftertreatment system heater 110 is based on firing fraction implemented by the CDA system 104. For example, the CDA system 104 may deactivate one fourth of the cylinders in the engine system 102. In response, the power system 108 may provide power to the aftertreatment heater system 110 to utilize the heater at a first percentage of a full heating capacity of the aftertreatment system heater 110. As another example, the CDA system 104 may deactivate one half of the cylinders in the engine system 102. In response, the power system 108 may provide power to the aftertreatment heater system 110 to utilize the heater at a second percentage of a full heating capacity of the aftertreatment system heater 110, where the second percentage is lower than the first percentage. Accordingly, in some embodiments the percentage of power provided to the aftertreatment heater system 110 is proportional to the firing fraction implemented by the CDA system 104 (e.g., the power provided to the aftertreatment heater system 110 is increased as the firing fraction increases).

In some embodiments, the amount of power provided to the aftertreatment system heater 110 and the firing fraction are based on other factors such as NVH and fuel level. For example, the vehicle 100 may be operating such that the NVH operating ranges are not acceptable (and therefore, the CDA system 104 does not operate such that the firing fraction is 100%), but the temperature of the exhaust gas is determined to be increased. In such instances, the power system 108 may provide power to the aftertreatment heater system 110 as needed to increase the temperature of the exhaust gas to at least the threshold temperature. In addition, the vehicle 100 may be operating with a low fuel level, and the CDA system 104 may be activated to conserve fuel by decreasing the firing fraction. In such instances, the power system 108 may provide less power to the aftertreatment heater system 110, as fewer active cylinders leads to an increase in exhaust gas temperature.

In embodiments where there is a proportional relationship between the firing fraction and the power provided to the aftertreatment system heater 110, operation of the CDA system 104 and the aftertreatment system heater 110 may be coordinated based on an objective. Objectives include, but are not limited to, increasing a temperature of the exhaust gas, decreasing an amount of particulate matter present in the exhaust gas, and decreasing an amount of harmful emissions (e.g., NOR) present in the exhaust gas.

If additional power is not available, at 414 the controller 122 may take additional actions to increase the temperature of the exhaust gas. For example, the controller 122 may direct the power system 108 to provide power to an intake grid heater to increase the temperature of the air entering the cylinders, thereby increasing the temperature of the exhaust gas. The controller 122 may also direct the HC dosing system 116 to start injecting fuel into the exhaust gas to increase the temperature of the exhaust gas. Furthermore, the controller 122 may direct the fuel injection system 114 to inject fuel into the cylinder later, thereby increasing the temperature of the exhaust gas. The controller 122 may also direct the CAC bypass valve to the open position, thereby causing charge air to bypass the CAC system 118 and enter the cylinders at a higher temperature, thus increasing the temperature of the exhaust gas. Additionally, the controller 122 may direct the EGR bypass valve to the closed position, thereby preventing the recirculation of exhaust gas and increasing the temperature of the exhaust gas. The controller 122 can also increase a load on the engine (e.g., activating a generator, activating parasitic load devices, etc.), thereby increasing the temperature of the exhaust gas. In some embodiments, the additional actions described can be implemented by the controller 122 individually. In some embodiments, the additional actions described can be implemented by the controller 122 collectively (e.g., all of the additional actions are taken). In still other embodiments, the additional actions described can be taken by the controller 122 in various combinations of two or more actions. In some embodiments, the controller 122 may direct the additional actions to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

Accordingly, by implementing the method 400 the temperature of the exhaust gas can be increased by 1) operating the CDA system 104 and/or 2) operating the aftertreatment system heater 110, and/or 3) taking additional actions.

Though the steps of the method 400 were described in a particular order, one of ordinary skill would understand that the steps of the method 400 can be implemented in any order to cause the desired effect of increasing the temperature of the exhaust gas.

Figure 5:
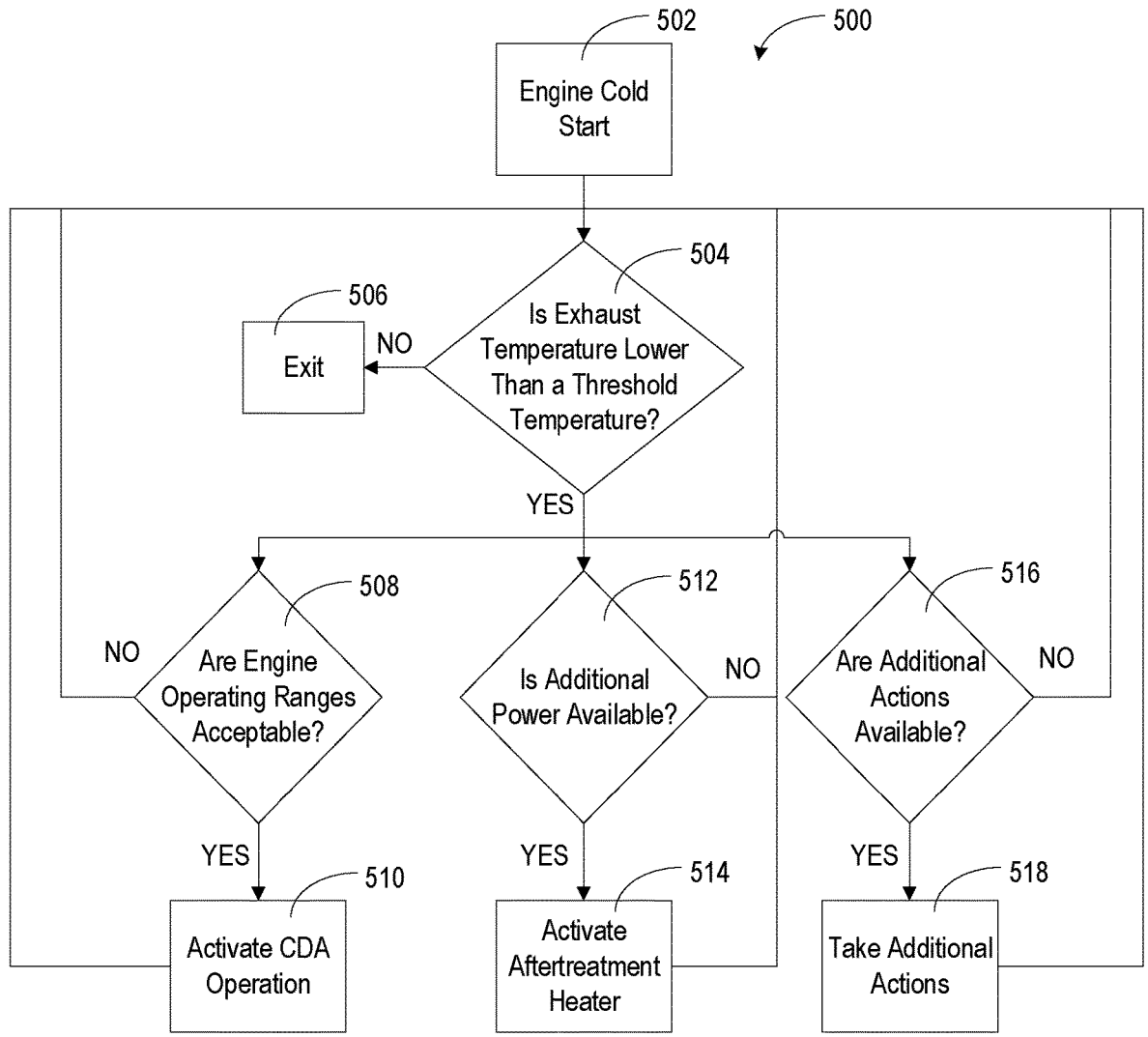
FIG. 5 is a flow diagram of a method to increase exhaust gas temperature under engine cold start conditions via coordination of cylinder deactivation operation and control of a heater for an exhaust aftertreatment system, according to an exemplary embodiment.

FIG. 5 is a flow diagram of a method 500 to increase exhaust gas temperature under engine cold start conditions via coordination of cylinder deactivation operation and control of a heater for an exhaust aftertreatment system, according to an exemplary embodiment. The method 500 may be implemented, at least in part, by the controller 122 such that reference is made to the controller 122 to aid in explanation of the method 500.

At 502, the engine system 102 is started in a cold start mode. As referred to herein, a "cold start" refers to the engine sitting for a long period of time where the engine temperature is substantially equal to that of the outside or ambient outside temperature. Thus, in very cold situations (e.g., below the freezing temperature of water), the air passing through the system is also very cold which means increasing the temperature to help promote catalyst efficiency is important to the operational ability of the catalyst of the system.

At 504, a determination is made as to whether the exhaust gas temperature is lower than a threshold temperature. For example, the vehicle may be traveling at a slow speed, thus requiring a low amount of power from the engine system 102, resulting in an exhaust gas temperature lower than the threshold temperature (e.g., approximately two hundred degrees Celsius). As described, the exhaust gas temperature may be determined directly. A direct measurement of the exhaust gas temperature may be achieved by, for example, providing a thermocouple that is coupled to the controller. The thermocouple may be provided anywhere in the flow of the exhaust gas to enable a direct temperature measurement at that particular location or locations (e.g., before the exhaust gas flows through a turbocharger, after the exhaust gas exits a turbocharger, before the exhaust gas interacts with a catalyst, after the exhaust gas interacts with a catalyst such as an oxidation catalyst, SCR catalyst, etc., or at any other point in the flow of the exhaust gas). The exhaust gas temperature may also be determined or predicted. In various example embodiments, the controller 122 may determine or predict the approximate temperature of the exhaust gas based on one or more of the speed of the engine, the amount of time the engine has been running after start up (i.e., engine run time, which may be after particular conditions, such as engine run time following a cold start versus a not cold start), the amount of fuel that has burnt for a given time (i.e., cumulative fuel burned, which may be after various conditions such as following a cold-start condition), operation of the aftertreatment system heater 110 (e.g., heater run time, wattage, etc.), and so on. The controller 122 may also determine or predict the approximate temperature of the exhaust gas based on a temperature of a catalyst bed of the aftertreatment system. The temperature of the catalyst bed can be determined or measured directly by measuring a temperature of any catalysts within the flow of the exhaust gas (e.g., catalysts within the DOC catalysts within the DPF, catalysts within the SCR, etc.). The temperature of the catalyst bed can also be determined or predicted. In various example embodiments, the controller 122 may determine or predict the approximate temperature of the catalyst bed based on one or more of the speed of the engine, the amount of time the engine has been running, the amount of fuel that has been burnt after a certain condition, operation of the aftertreatment system heater 110 (e.g., run time, wattage, etc.), etc. (e.g., via one or more look-up tables, algorithms, etc. that correlate one or more operating parameters to the desired data point(s)/metric(s)). The controller 122 compares the temperature of the exhaust gas and/or the catalyst bed temperature to the threshold temperature to determine whether the temperature of the exhaust gas is lower than the threshold temperature. If the temperature of the exhaust gas is higher than the threshold temperature, at 506 the method 500 is exited.

If the temperature of the exhaust gas is lower than the threshold temperature, at 508 a determination is made as to whether the NVH operating ranges of the vehicle 100 are acceptable. If the NVH operating ranges of the vehicle 100 are not acceptable, the controller 122 continues to monitor the temperature of the exhaust gas. If the NVH operating ranges of the vehicle 100 are acceptable (e.g., the NVH is acceptable), at 510 the controller 122 directs the CDA system 104 to operate to deactivate cylinders as needed. As described, deactivating cylinders can increase the temperature of the exhaust gas. Accordingly, the controller 122 may direct the CDA system 104 to deactivate one or more cylinders based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the CDA system 104 to deactivate one cylinder. If the temperature of the exhaust gas is within a second range of the threshold temperature (e.g., within between twenty-six and fifty degrees of the threshold temperature), the controller 122 may direct the CDA system 104 to deactivate two cylinders. In some embodiments, the controller 122 may direct the CDA system 104 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

At 512, a determination is made as to whether additional power is available. For example, the controller 122 may determine, based on the SOC of the battery and/or the alternator, that additional power is available. Additionally or alternatively, the controller 122 may determine that a temperature of the battery and/or the alternator is greater than a minimum threshold temperature and lower than a maximum threshold temperature, indicating that additional power is available. If additional power is not available, the controller 122 continues to monitor the temperature of the exhaust gas. If additional power is available, at 514 the aftertreatment system heater 110 is activated. As described, heating the exhaust gas with the aftertreatment system heater 110 can increase the temperature of the exhaust gas. Accordingly, the controller 122 may direct the aftertreatment system heater 110 to heat the exhaust gas based on the comparison of the temperature of the exhaust gas to the threshold temperature. For example, if the temperature of the exhaust gas is within a first range of the threshold temperature (e.g., within twenty-five degrees Celsius of the threshold temperature), the controller 122 may direct the power system 108 to provide a first power level to the aftertreatment system heater 110 such that the heater reaches a first temperature. If the temperature of the exhaust gas is within a second range of the threshold temperature (e.g., within between twenty-six and fifty degrees of the threshold temperature), the controller 122 may direct the power system 108 to provide a second power level to the aftertreatment system heater 110 such that the aftertreatment system heater 110 reaches a second temperature that is higher than the first temperature. In some embodiments, the controller 122 may direct the aftertreatment system heater 110 to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

In some embodiments, the amount of power provided to the aftertreatment system heater 110 is based on firing fraction implemented by the CDA system 104 and/or factors such as NVH and fuel level as described. Further and as described above, in embodiments where there is a proportional relationship between the firing fraction and the power provided to the aftertreatment system heater 110, operation of the CDA system 104 and the aftertreatment system heater 110 may be coordinated based on an objective, which may include, but is not limited to, increasing a temperature of the exhaust gas, decreasing an amount of particulate matter present in the exhaust gas, and decreasing an amount of harmful emissions (e.g., NOR) present in the exhaust gas.

At 516 a determination is made as to whether additional actions are available. In an example embodiment, if the controller 122 determines that no additional actions are available, the controller 122 continues to monitor the temperature of the exhaust gas. If the controller 122 determines that additional actions are available, at 518 the controller 122 implements the additional actions to increase the temperature of the exhaust gas. In an example embodiment, at 518 the controller 122 may determine, based on various factors, that the available additional actions include activating an intake grid heater and bypassing the CAC system 118. In yet another example embodiment, at 518 the controller 122 may determine, based on various factors, that the available actions include bypassing the EGR system 112. In some embodiments, the controller 122 may direct the additional actions to operate until the temperature of the exhaust gas reaches a target temperature. The target temperature may refer to a temperature greater than the threshold temperature by a certain amount (e.g., fifty degrees Celsius, one hundred degrees Celsius, etc.). The target temperature may also refer to a temperature greater than the threshold temperature by a percentage (e.g., fifteen percent greater, thirty percent greater, etc.).

The factors considered by the controller 122 in determining whether additional actions are available include the SOC of the power system 108 (e.g., sufficient power must be available for the additional actions), the temperature of the exhaust gas relative to the threshold temperature and/or the target temperature (e.g., many additional actions may be taken if the temperature of the exhaust gas is very low relative to the threshold temperature, but only one additional action may be taken if the temperature of the exhaust gas is very close to the threshold temperature). The factors considered may also include the particulate matter level relate to a particulate matter threshold (e.g., many additional actions may be taken if the particulate matter level is very high relative to the threshold particulate matter level, but only one additional action may be taken if the particulate matter level is very close to the threshold particulate matter level) and an oxygen level (e.g., many additional actions may be taken if the oxygen level is very low relative to the threshold oxygen level, but only one additional action may be taken if the oxygen level is very close to the threshold oxygen level).

Accordingly, by implementing the method 500 the temperature of the exhaust gas can be increased by any combination of 1) operating the CDA system 104, 2) operating the aftertreatment system heater 110, and 3) taking additional actions. As shown in FIG. 5, the method 500 includes executing steps 508, 512, and 516 simultaneously or substantially simultaneously (e.g., the steps 508, 512, and 516 are executed within two seconds). Therefore, steps 510, 514, and 518 can all occur simultaneously or substantially simultaneously.

Though the steps of the method 500 were described in a particular order, one of ordinary skill would understand that the steps of the method 500 can be implemented in any order to cause the desired effect of increasing the temperature of the exhaust gas.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 122 may include any number of circuits for completing the functions described herein. For example, the activities and functionalities of the circuits 232-236 may be combined in multiple circuits or as a single circuit. Additional circuits with additional functionality may also be included. Further, the controller 122 may further control other activity beyond the scope of the present disclosure.

As mentioned above and in one configuration, the "circuits" may be implemented in machine-readable medium for execution by various types of processors, such as the processor 212 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A system comprising:
an aftertreatment system heater of an exhaust aftertreatment system coupled to an engine; and
a controller coupled to the aftertreatment system heater, the controller configured to:
determine a condition of an exhaust gas from the engine;
compare the condition of the exhaust gas to a predefined threshold;
in response to determining that the condition of the exhaust gas does not meet the predefined threshold, determine whether an engine operating condition is met for activating a cylinder deactivation operating mode for the engine;
in response to determining that the engine operating condition is met, operate the engine in the cylinder deactivation operating mode by deactivating a cylinder of a plurality of cylinders; and
in response to determining that the engine operating condition is not met, activate the aftertreatment system heater to heat the exhaust gas.

2. The system of claim 1, wherein in response to determining that the engine operating condition is not met, the controller is configured to:
compare an amount of power available in a power system to a predefined threshold amount of power; and
in response to determining that the amount of power available is greater than the predefined threshold amount of power, operating the aftertreatment system heater to heat the exhaust gas.

3. The system of claim 2, wherein in response to determining that the condition of the exhaust gas does not meet the predefined threshold, the engine operating condition is not met, and the amount of power available does not meet the predefined threshold amount of power, the controller is configured to one or more of: activate a grid heater associated with an intake of the engine, inject fuel upstream of a diesel oxidation catalyst, cause intake air to bypass a charge air cooler, decrease an amount of the exhaust gas recirculated by bypassing an exhaust gas recirculation system, increase a load on the engine, and perform a post-injection of fuel into at least one of the plurality of cylinders.

4. The system of claim 1, wherein the condition of the exhaust gas comprises one or more of: a measured temperature of the exhaust gas, a predicted temperature of the exhaust gas, an amount of nitrous oxides in the exhaust gas, an amount of particulate matter present in the exhaust gas, a measured temperature of a catalyst bed, and a predicted temperature of the catalyst bed.

5. The system of claim 1, wherein the aftertreatment system heater comprises one or more of: a grid heater, a heater within a selective catalytic reduction system, an induction heater, a microwave heater, and a fuel burner.

6. The system of claim 1, wherein the cylinder deactivation operating mode is a skip-fire mode.

7. The system of claim 1, wherein the cylinder deactivation operating mode is a fixed cylinder deactivation mode.

8. A method of reducing emissions, comprising:
determining a condition of an exhaust gas from an engine;
comparing the condition of the exhaust gas to a predefined threshold;
in response to determining that the condition of the exhaust gas does not meet the predefined threshold, determining whether an engine operating condition is met for activating a cylinder deactivation operating mode for the engine;
in response to determining that the engine operating condition is met, operating the engine in the cylinder deactivation operating mode by deactivating a cylinder of a plurality of cylinders;
comparing an amount of power available in a power system to a predefined threshold amount of power; and
in response to determining that the amount of power available in the power system is greater than the predefined threshold, activating an aftertreatment system heater to heat the exhaust gas.

9. The method of claim 8, further comprising:
in response to determining that 1) the engine operating condition is met or 2) the engine operating condition is not met, comparing an amount of power available in the power system to a predefined threshold amount of power; and in response to determining that the amount of power available in the power system is greater than the predefined threshold, activating the aftertreatment system heater to heat the exhaust gas.

10. The method of claim 9, wherein in response to determining that the condition of the exhaust gas does not meet the predefined threshold, the engine operating condition is not met, and the amount of power available does not meet the predefined threshold amount of power, one or more of: activating a grid heater associated with an intake of the engine, injecting fuel upstream of a diesel oxidation catalyst, causing intake air to bypass a charge air cooler, decreasing an amount of the exhaust gas recirculated by bypassing an exhaust gas recirculation system, increasing a load on the engine, and performing a post-injection of fuel into at least one of the plurality of cylinders.

11. The method of claim 8, wherein the condition of the exhaust gas comprises one or more of: a temperature of the exhaust gas, a predicted temperature of the exhaust gas, an amount of nitrous oxides present in the exhaust gas, and an amount of particulate matter present in the exhaust gas, a measured temperature of a catalyst bed, and a predicted temperature of the catalyst bed.

12. The method of claim 8, wherein the aftertreatment system heater comprises one or more of: a grid heater, a heater within a selective catalytic reduction system, an induction heater, a microwave heater, and a fuel burner.

13. The method of claim 9, wherein determining whether there is sufficient power to operate the aftertreatment system heater comprises determining whether a temperature of a battery is within a threshold range.

14. The method of claim 9, wherein determining whether there is sufficient power to operate the aftertreatment system heater comprises determining whether a charge level of a battery is greater than a predetermined charge threshold.

15. A method of reducing emissions from an engine, comprising:
determining a condition of an exhaust gas from the engine;
comparing the condition of the exhaust gas to a predefined threshold;
in response to determining that the condition of the exhaust gas does not meet the predefined threshold:
determining whether an engine operating condition is met for activating a cylinder deactivation operating mode for the engine;
comparing an amount of power available in a power system to a predefined threshold amount of power; and
implementing additional actions;
wherein the determining whether the engine operating condition is met, the comparing the amount of power available, and the implementing additional actions occur substantially simultaneously;
in response to determining that the engine operating condition is met, operating the engine in the cylinder deactivation operating mode by deactivating a first cylinder of a plurality of cylinders; and
in response to determining that that the amount of power available in the power system is greater than the predefined threshold, activating an aftertreatment system heater to heat the exhaust gas.

16. The method of claim 15, wherein the additional actions comprise one or more of: activating a grid heater associated with an intake of the engine, injecting fuel upstream of a diesel oxidation catalyst, causing intake air to bypass a charge air cooler, decreasing an amount of the exhaust gas recirculated by bypassing an exhaust gas recirculation system, increasing a load on the engine, and performing a post-injection of fuel into at least one of the plurality of cylinders.

17. The method of claim 15, wherein the condition of the exhaust gas comprises one or more of: a measured temperature of the exhaust gas, a predicted temperature of the exhaust gas, an amount of nitrous oxides present in the exhaust gas, and an amount of particulate matter present in the exhaust gas, a measured temperature of a catalyst bed, and a predicted temperature of the catalyst bed.

18. The method of claim 15, wherein the aftertreatment system heater comprises one or more of: a grid heater, a heater within a selective catalytic reduction system, an induction heater, a microwave heater, and a fuel burner.

19. The method of claim 15, wherein the cylinder deactivation operating mode is a skip-fire mode.

20. The method of claim 15, wherein the cylinder deactivation operating mode is a fixed cylinder deactivation mode.

* * * * *